( 12 ) United States Patent
Iizuka et al.

(10) Patent No.: US 7,130,472 B2
(45) Date of Patent: Oct. 31, 2006

(54) IMAGE DISTRIBUTION APPARATUS, COMMUNICATION TERMINAL APPARATUS, AND CONTROL METHOD THEREOF

(75) Inventors: Yoshio Iizuka, Kanagawa (JP); Tomoaki Kawai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 781 days.

(21) Appl. No.: 10/340,720

(22) Filed: Jan. 13, 2003

(65) Prior Publication Data

US 2003/0138149 A1 Jul. 24, 2003

(30) Foreign Application Priority Data

Jan. 21, 2002 (JP) ............................. 2002-011705
Feb. 28, 2002 (JP) ............................. 2002-052983
Mar. 1, 2002 (JP) ............................. 2002-055579

(51) Int. Cl.
*G06K 9/36* (2006.01)

(52) U.S. Cl. ...................... 382/236; 382/233; 382/250; 382/251; 382/252; 375/240.12

(58) Field of Classification Search ............... 382/232, 382/233, 236, 250, 251, 252, 274; 375/240.12, 375/240.24; 348/345, 362, 400.1, 402.1, 348/407.1, 415.1, 420.1, 400.01
See application file for complete search history.

(56) References Cited

U.S. PATENT DOCUMENTS

| 5,253,057 | A  | * | 10/1993 | Terui et al. | ............ | 375/240.12 |
| 5,898,457 | A  | * | 4/1999  | Nagao et al. | ............ | 348/14.1   |
| 6,304,606 | B1 | * | 10/2001 | Murashita et al. | ....... | 375/240.24 |
| 2001/0043744 | A1 | * | 11/2001 | Hieda | .................... | 382/232 |
| 2002/0131494 | A1 | * | 9/2002  | Fukuda et al. | ......... | 375/240.03 |

\* cited by examiner

*Primary Examiner*—Jingge Wu
*Assistant Examiner*—Ali Bayat
(74) *Attorney, Agent, or Firm*—Fitzpatrick, Cella, Harper & Scinto

(57) ABSTRACT

An image distribution apparatus divides image data of a single frame into a plurality of blocks, orthogonally transforms the blocks and calculates transformation coefficients, quantizes the calculated transformation coefficients, codes the quantized transformation coefficients, and distributes the coded image data. The image distribution apparatus acquires the quantized transformation coefficients, stores the acquired transformation coefficients in a storage unit, calculates differences between the transformation coefficients of a first frame and the transformation coefficients of a second frame stored in the storage unit in a unit of block, counts blocks whose difference values calculated above are equal to or greater than a predetermined value as changing blocks of the first frame, and determines that the first frame has changed when the counted number of blocks is equal to or greater than a predetermined value.

18 Claims, 19 Drawing Sheets

FIG. 13

| BLOCK NUMBER (HATCHED PART REPRESENTS CHANGE-DETECTED BLOCKS) | IMAGE CHANGE INFORMATION (BIT STRING) |
|---|---|
| 0  1  2  3  4  5  6  7  8  9 | 0000000000 |
| 10 11 12 13 14 15 16 17 18 19 | 0000011000 |
| 20 21 22 23 24 25 26 27 28 29 | 0000011100 |
| 30 31 32 33 34 35 36 37 38 39 | 0000011100 |
| 40 41 42 43 44 45 46 47 48 49 | 0000011000 |
| 50 51 52 53 54 55 56 57 58 59 | 0000000000 |
| 60 61 62 63 64 65 66 67 68 69 | 0000000000 |
| 70 71 72 73 74 75 76 77 78 79 | 0000000000 |

FIG. 19

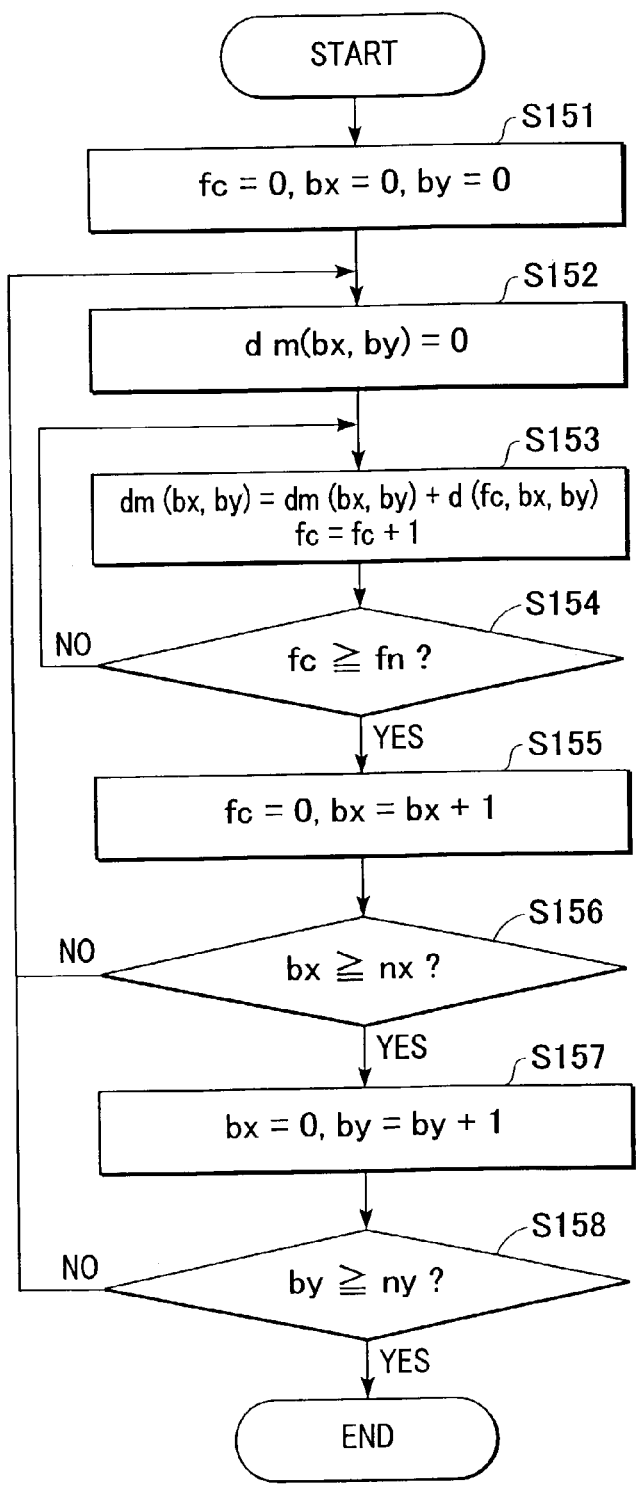

fc : FRAME COUNTER OF IMAGE CHANGE INFORMATION fn : NUMBER OF FRAMES IN IMAGE CHANGE INFORMATION INCLUDED IN SYNTHETIC DATA bx : BLOCK COUNTER IN X AXIS DIRECTION by : BLOCK COUNTER IN Y AXIS DIRECTION nx : NUMBER OF BLOCKS IN X AXIS DIRECTION ny : NUMBER OF BLOCKS IN Y AXIS DIRECTION d (fc, bx, by) :
IMAGE CHANGE INFORMATION AT BLOCK POSITION (bx, by) FOR fcTH FRAME dm (bx, by) :
MULTIPLE VALUE IMAGE CHANGE INFORMATION AT BLOCK POSITION (bx, by) OBTAINED FROM A PLURALITY OF FRAMES

IMAGE DISTRIBUTION APPARATUS, COMMUNICATION TERMINAL APPARATUS, AND CONTROL METHOD THEREOF

BACKGROUND OF THE INVENTION

1. Field of the Invention

The present invention relates to an image distribution apparatus preferable in using in an image distribution system that distributes images, a communication terminal apparatus, and a control method thereof, and more particularly relates to detection processing of changes in distributed images.

2. Description of the Related Art

In recent years, image distribution systems that continuously distribute images to client-side via a data transfer medium such as the Internet or an intranet and monitoring systems are already diffused, being used in various fields of, for example, distribution of live video images, indoor and outdoor monitoring, or observation of plants and animals. Further, some of these systems are provided with a function (a function of image change detection) that detects changes in images with time.

However, the conventional function of image change detection determined whether there has been a change in an image, according to the size of a pixel difference value between a current frame and a previous frame, which does not allow accurate determination on image changes due to effects by noise or the like. Further, it is not possible to set conditions of determination on image changes in the function of image change detection as conditions desired by users.

Still further, although the Internet is widely used as a user-friendly data transfer medium connecting image distribution apparatuses with communication terminals on client-side recently, a sufficient transfer capacity is not necessarily secured, because a transfer route is not fixed.

For example, in the case of using a modem, which is typically used with a personal computer, as a communication section with connection to a telephone line as a part of a transfer medium, the transfer rate is several ten k bit/second, and thus the transfer capacity is not large enough to continuously distribute images. A transfer capacity larger than several hundred M bit/sec is required in order to transfer present TV video signals with no degradation. Even using an efficient dynamic image coding system such as MPEG-2 (Motion Picture Coding Experts Group-2), which is an international standard, degradation is apparent with a data rate as low as 1 M bit/sec. Therefore, when transfer capacity is several ten k bit/sec at most, the image size is reduced, the frame rate is dropped, and the compression rate is increased, thereby reducing the data rate at a cost of degradation of the image quality of reproducing images.

Accordingly, in continuously distributing images via a low speed transfer medium, also due to an insufficient transfer capacity for transferring data other than image data (coded data), results of image change detection, which are transmitted from an image distribution apparatus to communication terminals on client-side, include only digital and simple information just for notifying as to whether there has been a change in an image for each frame.

Accordingly, communication terminals on client-side receive only very simple results of image change detection, making it impossible for clients to grasp optimum parameters for image change detection (parameters to decide a situation in which image changes can be determined) or to find optimum parameters that detect image changes.

Nor, is it possible to set desirable parameters for image change detection, from client-side to the image distribution apparatus via communication lines.

As described above, image data is usually coded to be transmitted to a transfer medium. Depending on the transfer speed of the transfer medium, the transmitting frame rate of image data is in general smaller than the frame rate of coded image data. In other words, a part of coded image data is not transmitted but is disposed. On the other hand, detection of image change is performed on all frames of input image data, thus results of image change detection are transmitted from the image distribution apparatus to the communication terminals of client-side one-sidedly. Accordingly, image change detection is performed with a rate greater than the transmitting frame rate. In addition, image data and results of image change detection are not always distributed with synchronization, and thus it is difficult to correctly recognize the results of image change detection in detail, for example, as to which region of which image frame changed at which timing.

Therefore, for example, in trying to set parameters of image change detection from client-side, detection situation is not recognized completely in correspondence with frames, causing a problem of requiring try and error for several times before parameters are decided.

SUMMARY OF THE INVENTION

With the background described above, it is an object of the present invention to provide an image distribution apparatus that reduces development and manufacturing cost and reduces errors in detection by increasing resistance to various disturbances, and a control method thereof.

Therefore, an image distribution apparatus according to a preferable embodiment of the invention divides image data of a single frame into a plurality of blocks; orthogonally transforms the blocks to calculate transformation coefficients; quantizes the calculated transformation coefficients; codes the quantized transformation coefficients; and delivers the coded image data to external equipment. The image distribution apparatus is comprised of an acquiring unit for acquiring the quantized transformation coefficients; a storage unit for storing the transformation coefficients acquired by the acquiring unit; a calculation unit for calculating the differences between the transformation coefficients of a first frame and the transformation coefficients of a second frame stored in the storage unit, in a unit of block; a changing block count unit for counting blocks with a value of difference calculated by the calculation unit, equal to or greater than a predetermined value, as changing blocks of the first frame (A changing block is a block where there has been a change.); and a detection unit for detecting a changing frame by determining that there has been a change in the first frame when the number of blocks counted by the changing block count unit is equal to or greater than a predetermined value (A changing frame is a frame in which there has been a change).

Further, an image distribution apparatus according to a preferable embodiment of the invention divides image data of a single frame into a plurality of blocks; orthogonally transforms the blocks to calculate transformation coefficients; quantizes the calculated transformation coefficients; codes the quantized transformation coefficients; and distributes the coded image data. The image distribution apparatus is comprised of a decoding unit for decoding the coded transformation coefficients; a storage unit for storing the transformation coefficients decoded by the decoding unit; a calculation unit for calculating the differences between the transformation coefficients of a first frame and the transformation coefficients of a second frame stored in the storage unit, in a unit of block; a changing block count unit for counting blocks with a value of difference, calculated by the calculation unit, equal to or greater than a predetermined value, as changing blocks of the first frame; and a detection unit for detecting a changing frame by determining that there has been a change in the first frame when the number of blocks counted by the changing block count unit is equal to or greater than a predetermined value.

Still further, a control method of an image distribution apparatus according to a preferable embodiment of the invention divides image data of a single frame into a plurality of blocks; orthogonally transforms the blocks to calculate transformation coefficients; quantizes the calculated transformation coefficients; codes the quantized transformation coefficients; and distributes the coded image. The control method of the image distribution apparatus is comprised of an acquiring process of acquiring the quantized transformation coefficients; a storage process of storing the transformation coefficients stored by the storage process; a calculation process of calculating the differences between the transformation coefficients of a first frame and the transformation coefficients of a second frame stored by the storage process, in a unit of block; a changing block count process of counting blocks with a value of difference, calculated by the calculation process, equal to or greater than a predetermined value, as changing blocks of the first frame; and a detection process of determining that there has been a change in the first frame when the number of blocks counted by the changing block count process is equal to or greater than a predetermined value.

Yet further, a control method of an image distribution apparatus according to a preferable embodiment of the invention divides image data of a single frame into a plurality of blocks; orthogonally transforms the blocks to calculate transformation coefficients; quantizes the calculated transformation coefficients; codes the quantized transformation coefficients; and distributes the coded image data. The control method of the image distribution apparatus is comprised of a decoding process of decoding the coded transformation coefficients; a storage process of storing the transformation coefficients decoded by the decoding process; a calculation process of calculating the differences between the transformation coefficients of a first frame and the transformation coefficients of a second frame stored by the storage process, in a unit of block; a changing block count process of counting blocks with a value of difference, calculated by the calculation process, equal to or greater than a predetermined value, as changing blocks of the first frame; and a detection process of determining that there has been a change in the first frame when the number of blocks counted by the changing block count process is equal to or greater than a predetermined value.

It is another object of the present invention to provide an image distribution apparatus that can set parameters for image change detection on the image distribution apparatus desired by users from communication terminals on client-side, and a control method thereof.

Therefore, an image distribution apparatus according to a preferable embodiment of the invention is connected to communication terminals via a network, and is comprised of a receiving unit for receiving parameters for image change detection from communication terminals via the network; an input unit for inputting image data; a detection unit for detecting image changes in the image data according to the parameters for image change detection received by the receiving unit; and a transmission unit for transmitting a detection result by the detection unit together with the image data to the communication terminal.

Further, a control method of an image distribution apparatus according to a preferable embodiment of the invention controls an image distribution apparatus connected to communication terminals via a network, and is comprised of a receiving process of receiving parameters for image change detection from communication terminals via the network; an input process of inputting image data; a detection process of detecting image changes in the image data according to the parameters for image change detection received by the receiving process; and a transmission process of transmitting detection results by the detection process together with the image data to the communication terminals.

Still further, a communication terminal apparatus according to a preferable embodiment of the invention is connected via a network to an image distribution apparatus provides with an image change detection function, and is comprised of a setting unit for setting parameters for image change detection to be applied to the image distribution apparatus; a transmission unit for transmitting the parameters for image change detection set by the setting unit to the image distribution apparatus; and a receiving unit for receiving image data and image change information showing detection results of image changes from the image distribution apparatus.

Yet further, a control method for a communication terminal according to a preferable embodiment of the invention controls a communication terminal apparatus connected via a network to an image distribution apparatus provided with an image change detection function, and is comprised of a setting process of setting parameters for image change detection to be applied to the image distribution apparatus; a transmission process of transmitting the parameters for image change detection set by the setting process to the image distribution apparatus; and a receiving process of receiving image data and image change information showing detection results of image change from the image distribution apparatus.

It is still another object of the present invention to provide an image distribution apparatus, a communication terminal apparatus, and a control method thereof, that make it possible to correctly grasp image changes in distributed image data with time.

Therefore, a communication terminal apparatus according to an embodiment of the invention is connected to an image distribution apparatus provided with a function of image change detection via a network, and is comprised of a receiving unit for receiving image data and image change information for a plurality of frames of the image data from the image distribution apparatus; and a display control unit for displaying the image data received by the receiving unit, synthesizing the image data with the image change information for the plurality of frames.

Further, a control method of a communication terminal apparatus according to another embodiment of the invention controls a communication terminal apparatus connected to an image distribution apparatus provided with a function of image change detection via a network, and is comprised of a receiving process of receiving image data and image change information for a plurality of frames of the image data from the image distribution apparatus; and a display control process of displaying the image data received by the receiving process, synthesizing the image data with the image change information for the plurality of frames.

Still further, an image distribution apparatus according to another embodiment of the invention is connected to a communication terminal via a network, and is comprised with an image data holding unit for holding image data that is input; an image change information holding unit for holding image change information that corresponds to the input image data for a plurality of frames; and a distribution unit for distributing the image data held by the image data holding unit and image change information that corresponds to the image data for the plurality of frames held by the image change information holding unit, to the communication terminal.

Yet further, a control method of an image distribution apparatus according to another embodiment of the invention controls an image distribution apparatus connected to a communication terminal via a network, and is comprised with an image data holding process of holding image data that is input; an image change information holding process of holding image change information that corresponds to the input image data for a plurality of frames; and a distribution process of distributing the image data held by the image data holding process and image change information that corresponds to the image data for the plurality of frames held by the image change information holding process, to the communication terminal.

Further objects, features and advantages of the present invention will become apparent from the following description of the preferred embodiments (with reference to the attached drawings).

BRIEF DESCRIPTION OF THE DRAWINGS

FIG. 13 is a diagram illustrating image change information for a single frame.

FIG. 19 is s flowchart showing preprocessing prior to a procedure to display image change information for a plurality of frames according to still another embodiment of the invention.

DESCRIPTION OF THE PREFERRED EMBODIMENTS

Preferred embodiments of the present invention will be described now with reference to accompanying drawings.

First Embodiment

Figure 1:
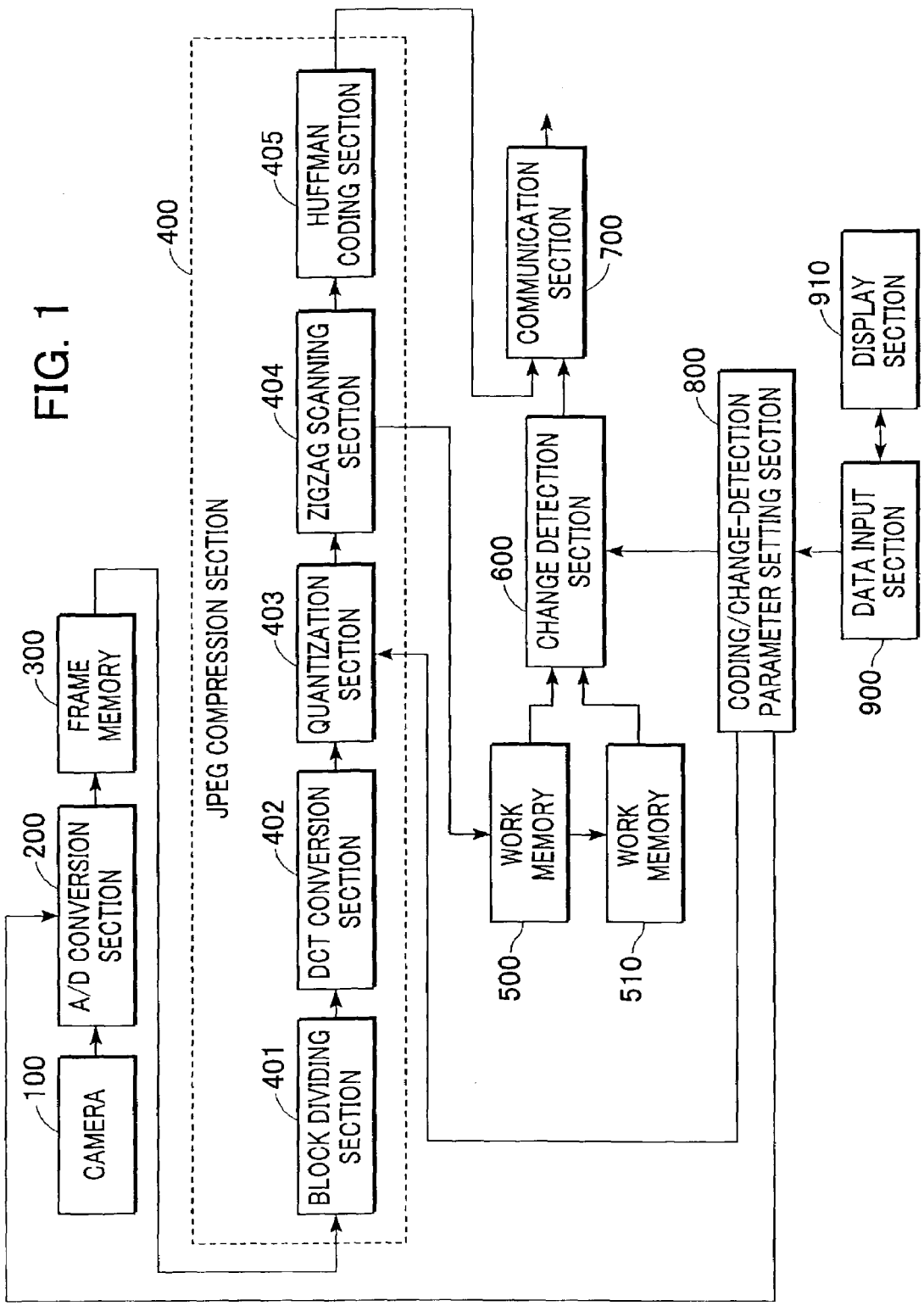
FIG. 1 is a block diagram showing a configuration of an image distribution apparatus of an image distribution system (or a monitoring system) provided with an image change function according to a first embodiment of the present invention.

FIG. 1 is a block diagram showing a configuration of an image distribution apparatus of an image distribution system provided with an image change detection section according to a first embodiment of the invention.

In FIG. 1, an analog video signal output by a camera 100 is converted into a digital signal (image data) by an A/D conversion section 200, and then stored in a frame memory 300. Next, a JPEG compression section 400 reads out the image data stored in the frame memory 300, compresses the image data by JPEG, and then delivers the compressed data to a communication section 700. The communication section 700 transmits the compressed data according to a predetermined procedure.

The JPEG compression section 400 is comprised of a block dividing section 401, a DCT transformation section 402, a quantization section 403, a zigzag scanning section 404, and a Huffman coding section 405.

The block dividing section 401 reads out the image data stored in the frame memory 300 in a unit of block with a size of 8 pixels×8 pixels.

The DCT transformation section 402 DCT-transforms the image data in a unit of block to generate a two dimensional transformation coefficient string. The quantization section 403 utilizes a quantization table, which is an array of quantized step widths for quantization assigned to each order of the transformation coefficients.

The zigzag scanning section 404 scans the two dimensional transformation coefficient array from a low frequency component in order to form a one dimensional transformation coefficient array. The Huffman coding section 405 utilizes a Huffman coding table, which is a transformation table from fixed-length codes to variable-length codes, thereby performing variable-length coding of the transformation coefficient array in order to compress the data volume.

More details are described in ISO/IEC10918-1, which is an international standard of image coding systems, and are omitted here.

With regard to the image distribution apparatus shown in FIG. 1, it is assumed that data output from the zigzag scanning section 404 can be output to external equipment outside the JPEG compression section 400, and this external output data (a transformation coefficient array) is transferred to a work memory 500. The transformation coefficient array stored in the work memory 500 is transferred to a work memory 510 for each period (the data renewal period of the frame memory 300).

A change detection section 600 uses the transformation coefficient array of a current frame read out from the work memory 500 and the transfer coefficient array of a previous frame read out from the work memory 510 to perform change detection by the procedures shown in the flowcharts in FIGS. 7 and 8, described later, and thus delivers the result of the change detection to a communication section 700.

Figure 2:
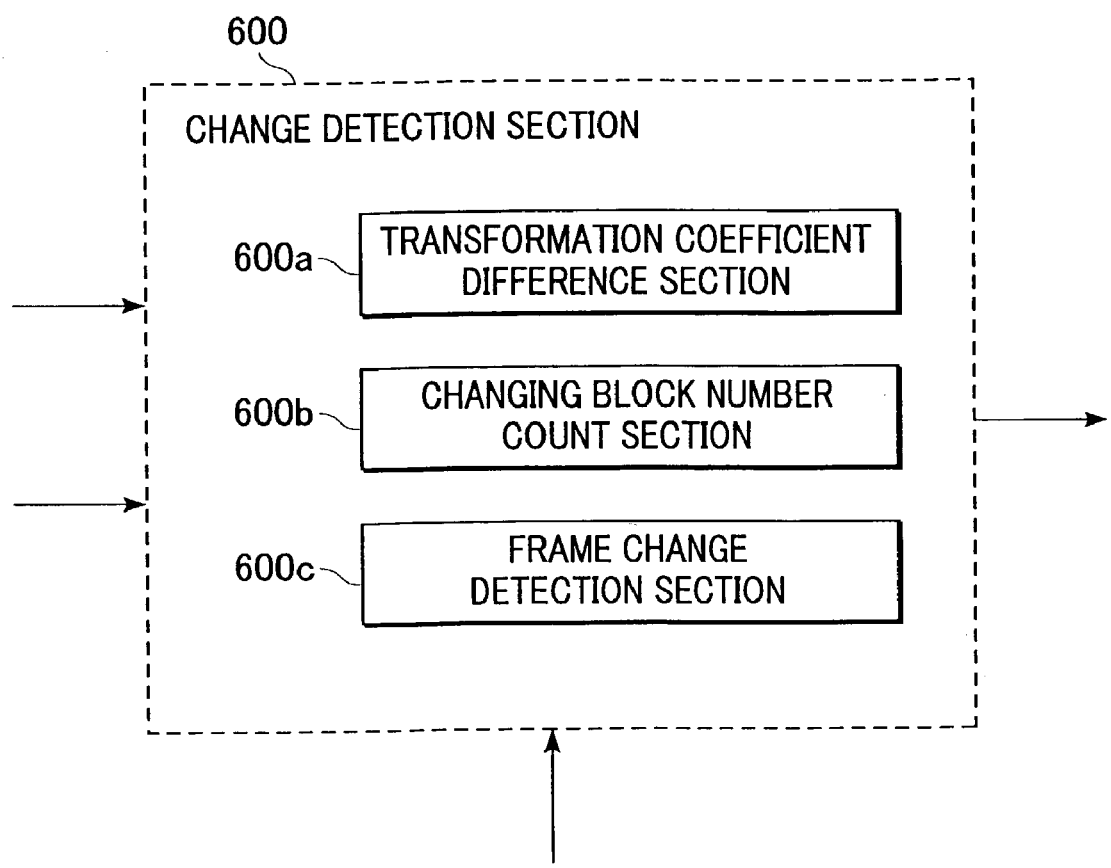
FIG. 2 is a block diagram showing a detailed configuration of a change detection section 600 in FIG. 1.

FIG. 2 is a block diagram showing a detailed configuration of the change detection section 600 in FIG. 1.

As shown in FIG. 2, the change detection section 600 is comprised of a transformation coefficient difference section 600a that calculates the difference between the transformation coefficient array of the current frame stored in the work memory 500 and the transformation coefficient array of the past frame stored in the work memory 510 in a unit of block, a changing block number count section 600b that counts, as changing blocks of the current frame, the number of blocks on which the difference between the transformation coefficient array of the current frame and the transformation coefficient array of the past frame is equal to or greater than a predetermined threshold, and a frame change detection section 600c which determines that there has been a change in the current frame when the number of changing blocks of the current frame is equal to or greater than a predetermined threshold. The communication section 700 transmits the compressed data and the result of change detection, according to the predetermined procedure.

In FIG. 1, a data input section 900 is a device for user to input coding parameters and parameters for change detection, using a graphical user interface (GUI) such as the various windows displayed on a display section 910, as shown in FIGS. 3 to 6 described later. A coding/change-detection parameter setting section 800 performs coding control and change detection control using the input coding parameters and parameters for change detection.

It is not necessary to directly connect the data input section 900 and the data display section 910 to the coding/change-detection parameter setting section 800, as shown in FIG. 1. It is also possible to use a display device or a data input device that are connected externally via the communication section 700. In this case, two-way communication is performed between the coding/change-detection parameter setting section 800, and the external display device or data input device via the communication section 700.

Figure 3:
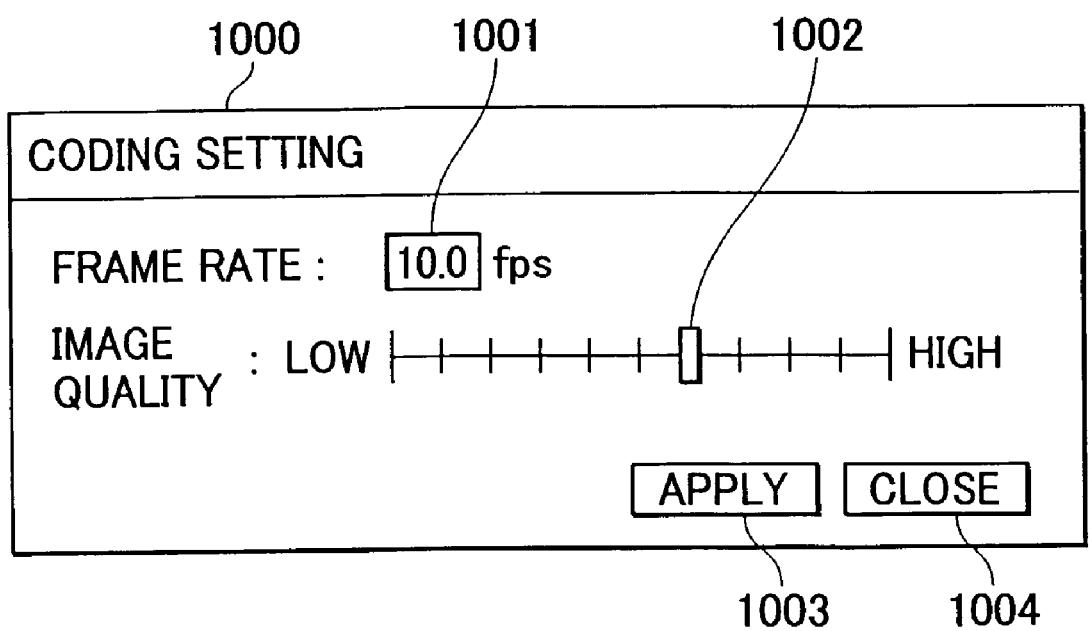
FIG. 3 is a schematic diagram of a coding setting window displayed on a display section 910 for user to input coding parameters.

FIG. 3 is a schematic diagram of a coding setting window displayed on the display section 910 for user to input coding parameters.

In FIG. 3, a coding setting window 1000 is displayed when user inputs a certain command from the data input section 900. Both values shown in FIG. 3 can be changed by user.

The number of image frames to be processed per second is displayed in a frame rate setting box 1001, and the value that corresponds to quantizing factor for changing contents of a quantizing table used by the quantizing section 403 is displayed in an image quality setting bar 1002. When user presses an applying button 1003 after changing these values, the values are transmitted to the coding/change-detection parameter setting section 800. Further, a frame rate setting value is transmitted to the A/D conversion section 200, thus changing the frame rate of image data output from the A/D conversion section 200. On the other hand, an image quality setting value is converted into a quantizing factor value and then transmitted to the quantizing section 403 to change contents of the quantizing table. When user presses a closing button 1004, the coding setting window 100 closes.

Figure 4:
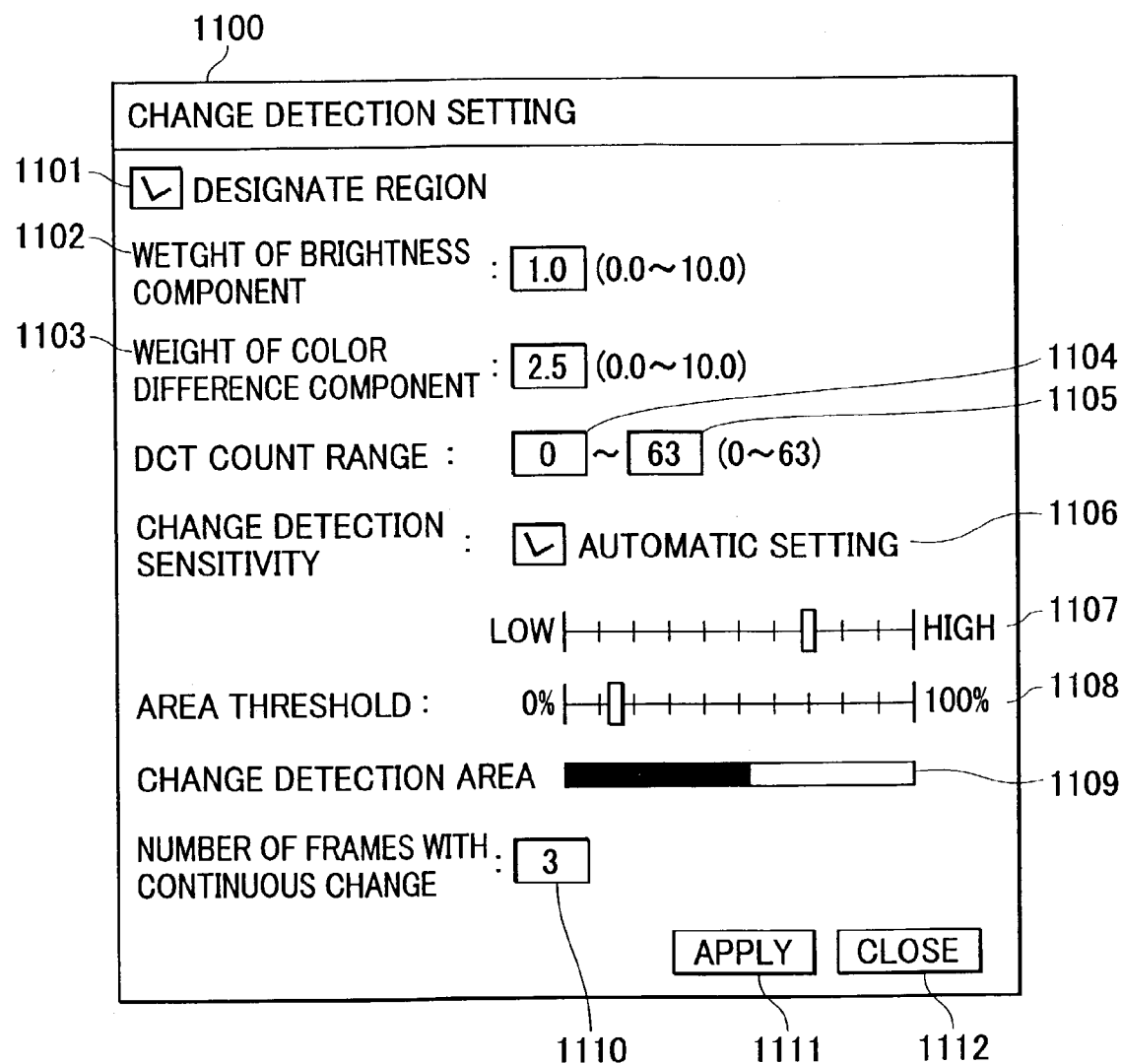
FIG. 4 is a schematic diagram of a change detection setting window displayed on the display section 910 for user to input change detection parameters.

FIG. 4 is a schematic diagram of a change detection setting window displayed on the display section 910 for user to input parameters for change detection.

In FIG. 4, a change detection setting window 1100 is displayed when user inputs a certain command from a data input terminal. The values shown in FIG. 4 can be changed by user all but a change detection area described later.

In a region designation check box 1101, a check box that indicates as to whether to designate or not a region to carry out change detection (a change detection objective region) is displayed. When this check box is checked, designation of a change detection objective region is performed using a region designation window in FIG. 5 or 6 described later. On the other hand, when this check box is not checked, the entire image is the change detection objective region.

Further, a weight to be given to the brightness component of an image in performing change detection is displayed in a brightness component weight setting box 1102. For example, if this value is 0.0, then the brightness component is not used in change detection. similarly, a weigh to be given to the color difference component of an image in performing change detection is displayed in a color difference weight setting box 1103. If this value is 0.0, then the color difference component is not used in change detection.

In the case of having decided to always use, for example, only the brightness component with a predetermined weight instead of using the above described brightness component weight setting box 1102 or color difference component weight setting box 1103, memory capacity can be saved because it is not necessary to store the color difference component in the work memory 500 or the work memory 510.

In a top setting box 1104 and a last setting box 1105 for setting a range of DCT coefficients, a top value and a last value in a range of orders of DCT coefficients to be used in change detection are displayed. The range of orders of DCT coefficients for a block with a size of 8 pixels×8 pixels is from 0 to 63. For example, components of DCT coefficients with higher orders are not set to be used for change detection when an image taken by the camera 100 includes a lot of noise, or components of DCT coefficients with lower orders are not set to be used for change detection when the average brightness or the average color difference of the image are not constant due to unstable illumination conditions, thereby a preferable result of change detection can be obtained.

In the case of having decided to always use, for example, only a predetermined range of orders of DCT coefficients instead of using the above described top setting box 1104 and the last setting box 1105 for setting a range of DCT coefficients, memory capacity can be saved because it is not necessary to store the DCT coefficients with orders out of the predetermined range in the work memory 500 or the work memory 510.

Figure 7:
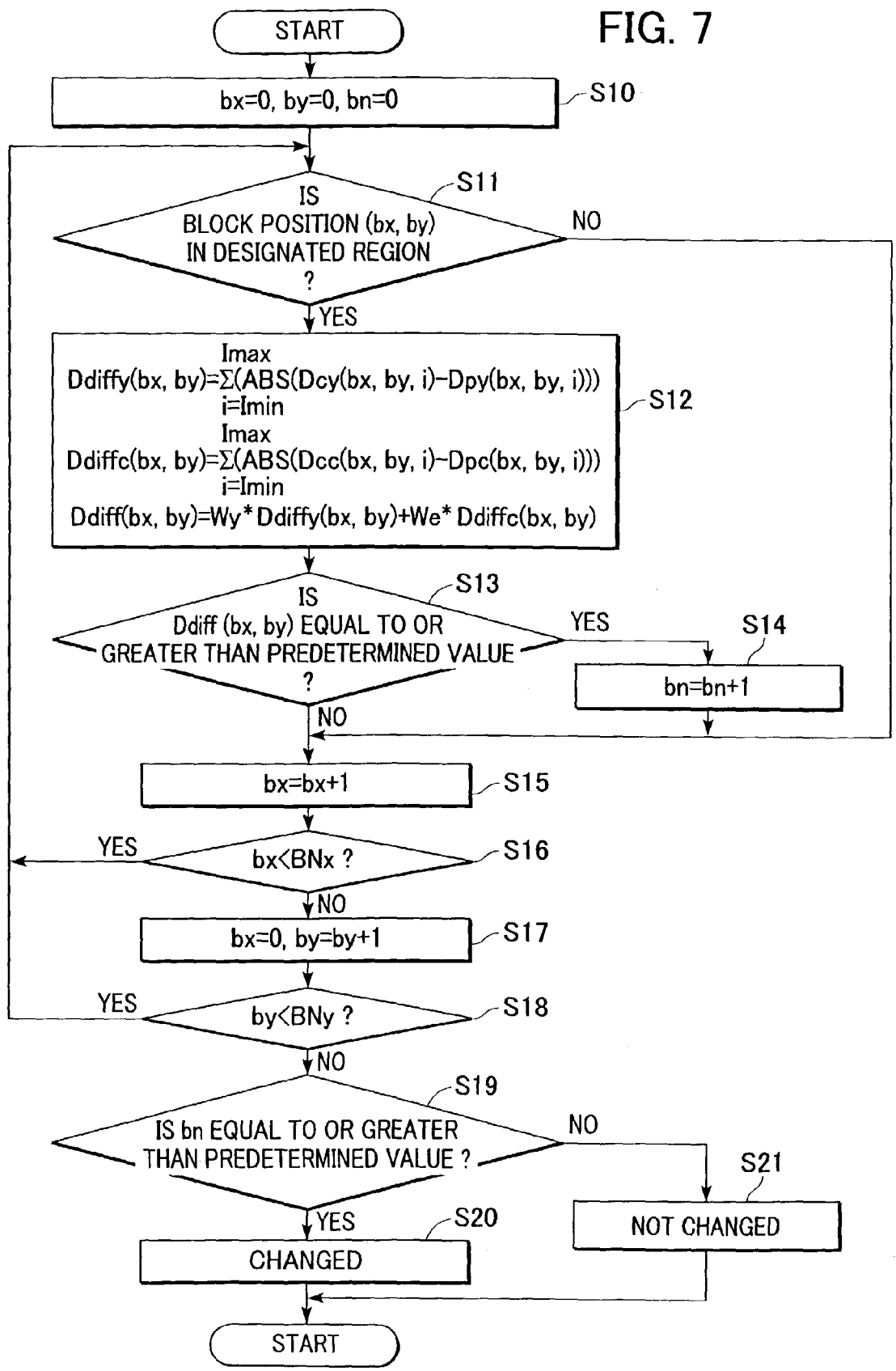
FIG. 7 is a flowchart showing a procedure of a change detection process of a current frame in a change detection section 600 of the image distribution apparatus according to the invention.

Further, in an automatic setting check box 1106 for change detection sensitivity, a check box that indicates as to whether to automatically set a threshold (a block change threshold) of the amount of change in transformation coefficients between frames on each block, described in detail in FIG. 7, is displayed.

When this check box is checked, an image quality set value of coding parameters is multiplied by a certain coefficient in order to calculate a block change threshold.

When this check box is not checked, a block change threshold is obtained from a value displayed in a change detection sensitivity setting bar 1107. When the change detection sensitivity is set high (in other words, in a great set value), smaller block changes must be considered, accordingly it is assumed that a calculation rule is specified such that the block change threshold becomes small.

A threshold of the ratio of change detection area to change detection objective region is displayed in an area threshold setting bar 1108. The change detection area means the sum of areas of changing blocks (blocks determined to have changed) detected by the change detection section 600. For example, in the case that the area threshold is set to 15%, it is determined that there has been a change in a current frame when 15% or more of the change detection objective region is occupied by changing blocks. The change detection area of a current frame is displayed in a change detection area display bar 1109. User compares change in actual image with the transition of the change detection area by looking at them so that he/she can determine whether the change detection parameters currently set are proper values.

A threshold of number of frames for determining that a continuous change has occurred according to the number of continuously changing frames (frames determined to have changed) is displayed in a continuous change frame number setting box 1110. For example, in the case that this value is set to three frames, it is determined that a continuous change has occurred upon detection of three continuous changing frames, and the determination of continuous change is maintained as long as changing frames follow continuously.

When user presses an applying button 1111 after changing these set values, the values are transmitted to the coding/change-detection parameter setting section 800, and converted into each proper value (a change detection parameter), thereafter being transmitted to the change detection section 600. In the change detection section 600, change detection is carried out according to the procedures shown in the flowcharts in FIGS. 7 and 8, described later, using these change detection parameters. When user presses a closing button 1112, the change detection setting window 1100 closes.

Figure 5:
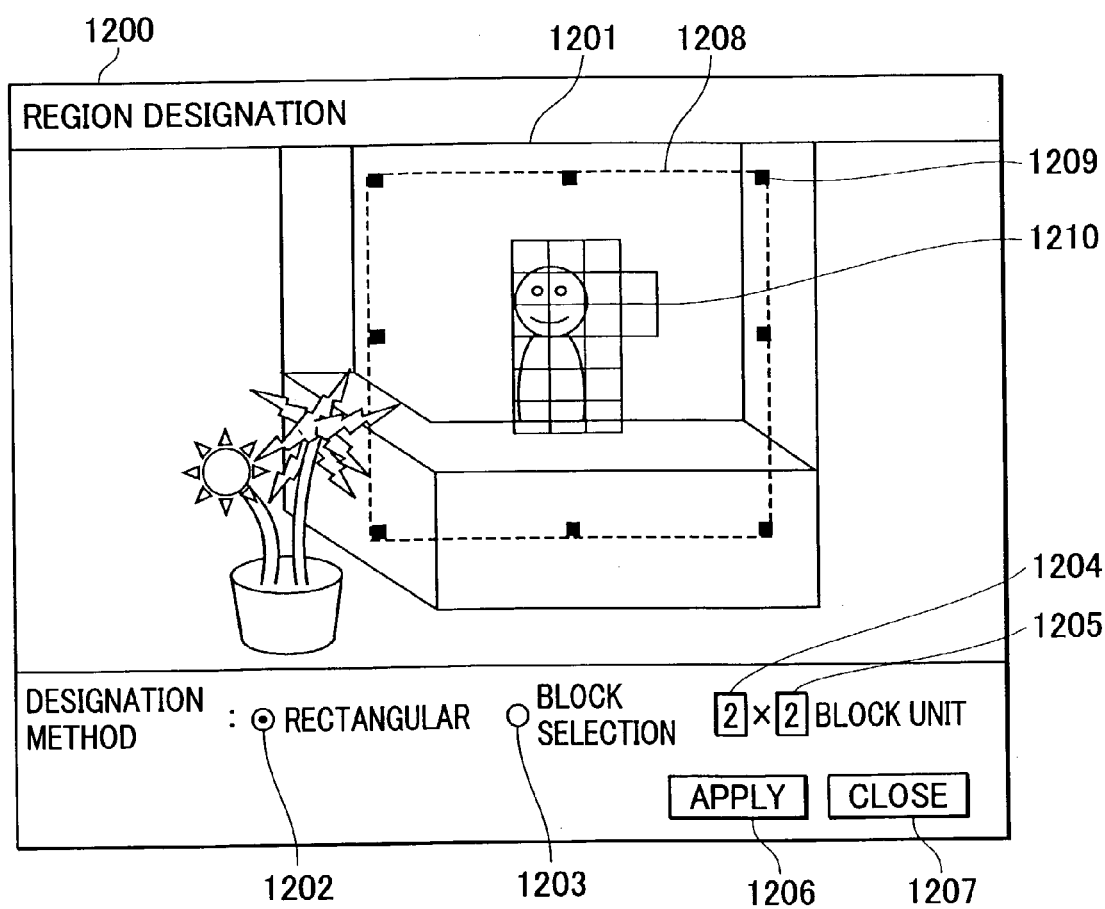
FIG. 5 is a schematic diagram showing a first exemplary display of a region designation window displayed on the display section 910.

FIG. 5 is a schematic diagram showing a first exemplary display of a region designation window displayed on the display section 910.

In FIG. 5, an image 1201, a change detection objective region designation frame 1208, a changing block display frame 1210, a designation method of a change detection objective region, and the like are displayed in a region designation window 1200.

In FIG. 5, an exemplary display of the case that a button for rectangular 1202 is selected as the designation method of change detection objective region.

The image 1201 can be obtained by reading out from the frame memory 300, or decoding JPEG compressed data received from the communication section 700. Resize points 1209 are displayed at the four corners and the centers of the four sides of the change detection objective region designation frame 1208.

User can change the position and size of the change detection objective region designation frame 1208 in a unit of block by mouse operation or the like carried out at the data input section 900. Specifically, when user moves a mouse cursor inside the change detection objective region designation frame 1208, and moves the mouse cursor while pressing a mouse button, a drawing control section, not shown, moves the position of the change detection objective region designation frame 1208 in a unit of block in correspondence to mouse input.

When user moves the mouse cursor onto a resize point 1209 and moves the mouse cursor while pressing the mouse button, the drawing control section, not shown, changes the size of the change detection objective region designation frame 1208 in a unit of block in correspondence to the mouse input. The drawing control section, not shown, displays a changing block display frames 1210 at the positions of changing blocks detected by the change detection section 600.

The button for rectangular 1202 is used to designate a change detection objective region, using the change detection objective region designation frame 1208 described above. Other buttons will be described below.

Figure 6:
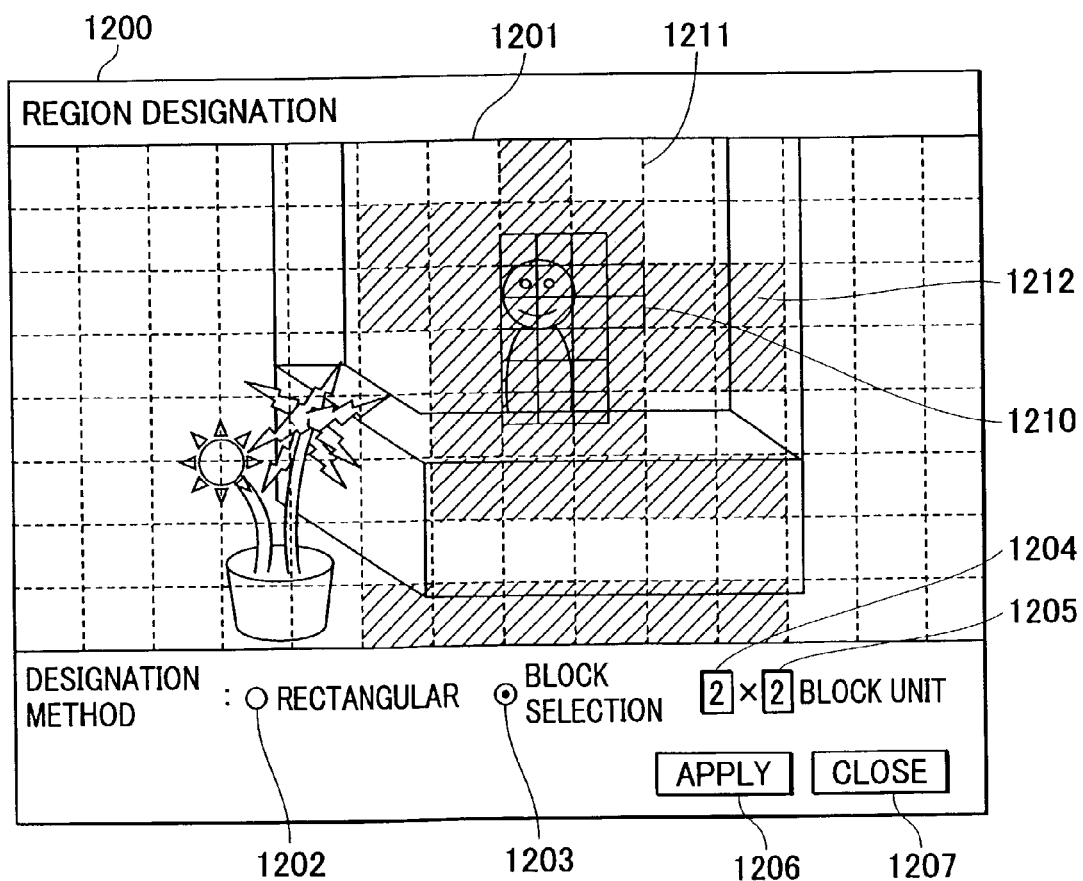
FIG. 6 is a schematic diagram showing a second exemplary display of a region designation window displayed on the display section 910.

FIG. 6 is a schematic diagram showing a second exemplary display of the region designation window 1200 displayed on the display section 910.

In FIG. 6, an image 1201, a block group boundary 1211, a selected block group 1212, a changing block display frame 1210, a change detection objective region designation method, and the like are displayed in the region designation window 1200. A block group consists of one or more blocks, having blocks in the same number in x axis direction and y axis direction.

As a change detection objective region designation method in the example in FIG. 6, a block selection button 1203 is selected, and value 2 is set in both an x axis direction block number setting box 1204 and a y axis direction block number setting box 1205.

When the block selection button 1203 is selected, the block group boundary 1211 is displayed in the image 1201. Since the block size is 8 pixels×8 pixels, the x direction interval and the y direction interval of the block group boundaries 1211 are 8 times of the set value in the x axis direction block number setting box 1204 and 8 times of the set value in the y axis direction block number setting box 1205 respectively, both the set values being included in the block group.

User can select the selected block group 1212 in any number arbitrarily by operating the mouse that uses the data input section 900.

Specifically, when user moves the mouse cursor to an arbitrary position in the image and presses the mouse button, the drawing control section, not shown, changes the display of a block group that is at the position of the mouse cursor into a selection state. For example, in the display section 910, masking is performed on the entire block group that has been selected, or the color of frame enclosing the block group is changed, thereby the selected block group is displayed. When user moves the mouse cursor onto a block group in the selection state and presses the mouse button, the display of the block group at the position of the mouse cursor is changed back into a non-selection state by the drawing section, not shown.

Similarly to the exemplary display shown in FIG. 5, the changing block display frame 1210 in FIG. 6 displays the position of changing blocks detected by the change detection section 600 with control by the drawing control section, not shown.

When user presses an application button 1206 after designating the change detection objective region, information on the position and size of the change detection objective region is transmitted to the coding/change-detection parameter setting section 800, and then the representing format of the information is converted depending on necessity, and the information is thereafter transmitted to the change detection section 600. When user presses a closing button 1207, the region designation window 1200 is closes.

FIG. 7 is a flowchart showing the procedure of a change detection process on a current frame by the change detection section 600 of an image distribution apparatus according to the present invention.

In the change detection section 600, first, a block counter bx in X axis direction, a block counter by in Y axis direction, and the number of blocks bn whose change has been detected are respectively initialized and set to 0 (step S10).

Next, it is determined whether the block position (bx, by) is within the change detection objective region or not (step S11). As a result, if the block position is within the range (YES), the procedure proceeds to step S12, and if not (NO), the procedure proceeds to step S15.

In the step S12, a difference amount Ddiff (bx, by) between the transformation coefficient array of the current frame and the transformation coefficient array of the previous frame at the block position (bx, by) is calculated, according to the following expressions (1), (2), and (3).

$$Ddiffy\ (bx,\ by) = \sum_{i=lmin}^{lmax} (ABS(Dcy\ (bx,\ by,\ i) - Dpy\ (bx,\ by,\ i))) \quad (1)$$

$$Ddiffy\ (bx,\ by) = \sum_{i=lmin}^{lmax} (ABS(Dcc\ (bx,\ by,\ i) - Dpc\ (bx,\ by,\ i))) \quad (2)$$

$$Ddiff\ (bx,\ by) = Wy \cdot Diffy\ (bx,\ by) + Wc \cdot Ddiffc\ (bx,\ by) \quad (3)$$

Ddiffy (bx, by) represents the difference amount between the transformation coefficient array of the brightness component of the current frame and the transformation coefficient array of the brightness component of the previous frame; Ddiffc (bx, by) represents the difference amount between the transformation coefficient array of the color difference component of the current frame and the transformation coefficient array of the color component of the previous frame, and i represents the order counter of coefficients.

Further, lmin represents the lower limit of the orders of transformation coefficients input from the top setting box 1104 within the DCT coefficient range in the change detection setting window 1100 in FIG. 4; lmax represents the upper limit of the orders of transformation coefficients input from the last setting box 1105 within the DCT coefficient range in the change detection setting window 1100 in FIG. 4.

Still further, Dcy (bx, by, i) represents the transformation coefficient in the order of i after quantization of the brightness component of the current frame at the block position (bx, by); Dpy (bx, by, i) represents the transformation coefficient in the order of i after quantization of the brightness component of the previous frame at the block position (bx, by); Dcc (bx, by, i) represents the transformation coefficient in the order of i after quantization of the color difference component of the current frame at the block position (bx, by); and Dpc (bx, by, i) represents the transformation coefficient in the order of i after quantization of the color difference component of the previous frame at the block position (bx, by).

Yet further, Wy represents the weight of the brightness component input from the brightness component weight setting box 1102 in the change detection setting window 1100 in FIG. 4; and Wc represents the weight of the color difference component input from the color difference component weight setting box 1103 in the change detection setting window 1100 in FIG. 4

Calculation of the difference amount Ddiff (bx, by) is performed by the transformation coefficient difference section 600a in the change detection section 600.

Next, it is determined whether the difference amount Ddiff (bx, by) between the transformation coefficient array of the current frame and the transformation coefficient array of the previous frame at the block position (bx, by), which was calculated in the step S12 according to the above expressions (1), (2), and (3), is equal to or greater than the above described block change threshold value, or not (step S13). As a result, if the difference amount Ddiff (bx, by) is equal to or greater than the block change threshold (YES), then 1 is added to the change detection blocks number bn (step S14).

If the difference amount Ddiff (bx, by) is smaller than the block change threshold (NO), then 1 is added to the block counter bx in X axis direction (step S15).

Further, it is determined whether the added block counter bx in X axis direction is smaller than the number of blocks BNx in X axis direction included in the image (step S16). The number of blocks BNx in X axis direction included in the image is the value of the image width W divided by the block width. As a result, if the added block counter bx in X axis direction is smaller than the number of blocks BNx in X axis direction included in the image (YES), then the process is returned to the step S11 to repeat the above described process.

If the added block counter bx in X axis direction is equal to or greater than the number of blocks BNx in X axis direction included in the image (NO), then 0 is given to the block counter bx in X axis direction, and 1 is added to the block counter by in Y axis direction (step S17).

Next, it is determined whether the added block counter by in Y axis direction is smaller than the number of blocks BNy in Y axis direction included in the image (step S18). The number of blocks BNy in Y axis direction included in the image is the value of the image height H divided by the block height. As a result, if the added block counter by in Y axis direction is smaller than the number of blocks BNy in Y axis direction included in the image (YES), then the process is returned to the step S12 to repeat the above described process.

If the added block counter by in Y axis direction is equal to or greater than the number of blocks BNy in Y axis direction included in the image (NO), then it is determined whether the change detection blocks number bn is equal to or greater than the changing block number threshold (step S19).

The changing block number threshold is obtained by a value (an area threshold) input to the area threshold setting bar 1108 multiplied by the number of blocks included in the change detection objective region and divided by a constant of 100. As a result, if the change detection blocks number bn is equal to or greater than the changing blocks number threshold (YES), then it is determined that there has been a change in the current frame (step S20).

If the change detection blocks number bn is less than the changing blocks number threshold (NO), then it is determined that there has not been a change in the current frame (step S21). Now, an image change detection procedure of the current frame is terminated.

The difference between the transformation coefficients of the current frame and the previous frame may be calculated in such a manner that the transformation coefficient difference section 600a gives a different weight for each order of transformation coefficients. The difference between the transformation coefficients of the current frame and the transformation coefficients of the previous frame also may be calculated in such a manner that the transformation coefficient difference section 600a uses only transformation coefficients in a predetermined order.

Figure 8:
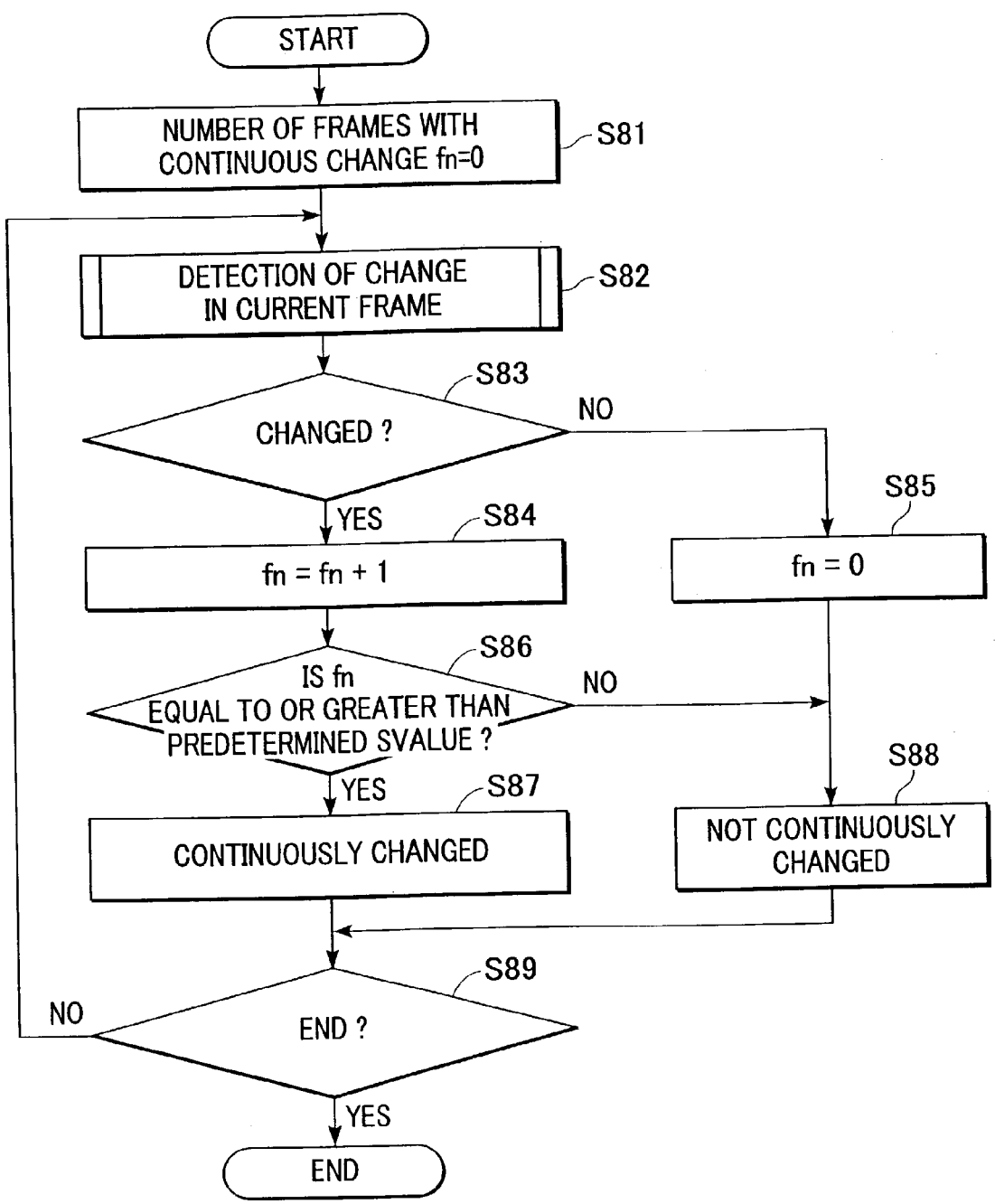
FIG. 8 is a flowchart showing a procedure of a continuous change detection process in the change detection section 600 of the image distribution apparatus according to the invention.

Next, FIG. 8 is a flowchart showing the procedure of a continuous change detection process by the change detection section 600 of the image distribution apparatus according to the present invention.

As shown in FIG. 8, the change detection section 600 first initializes a continuous change frame number fn to make fn o (step S81). Next, the change detection process on the current frame shown by the flowchart in FIG. 7 is performed (step S82).

According to the result of the process in the step S82, it is determined whether there has been a change in the current frame or not (step S83). As a result, if there has been a change (YES) in the current frame, then 1 is added to the continuous change flame number fn (step S84), and it is determined whether the continuous change frame number fn is equal to or greater than a predetermined value (step S86). This predetermined value is a value (a frame number threshold) input to the continuous change frame number setting box 1110 shown in FIG. 7. As a result, if the continuous change frame number fn is equal to or greater than a predetermined value (YES), then it is determined that there has been a continuous change (step S87).

If it is determined that there has not been a change (NO) in the step S83, then 0 is given to the continuous change frame number fn (step S85), and the procedure proceeds to step S88. If it is determined that the continuous change frame number fn is less than the predetermined value (NO) in step S86, then the procedure proceeds to the step S88. In the step S88, it is determined that there has not been a continuous change.

Then, it is determined whether to terminate the procedure of the continuous change detection process (step S89). As a result, if the procedure is not terminated (NO), then the procedure proceeds back to the step S82 to repeat the above mentioned process.

When a change detection parameter is changed using the change detection setting window 1100 in FIG. 4, the coding/change-detection parameter setting section 800 instructs the change detection section 600 to terminate the continuous change detection procedure, sets a new change detection parameter, and then instructs a start of the continuous change detection procedure again.

On the above described image distribution apparatus in FIG. 1, it has been assumed that the data output from the zigzag scanning section 404 can be output to external equipment outside the JPEG compression section 400. In using a JPEG chip for a general purpose as the JPEG compression section 400, if data cannot be output from the zigzag scanning section 4040, then an image distribution apparatus shown in FIG. 9 may be configured.

Figure 9:
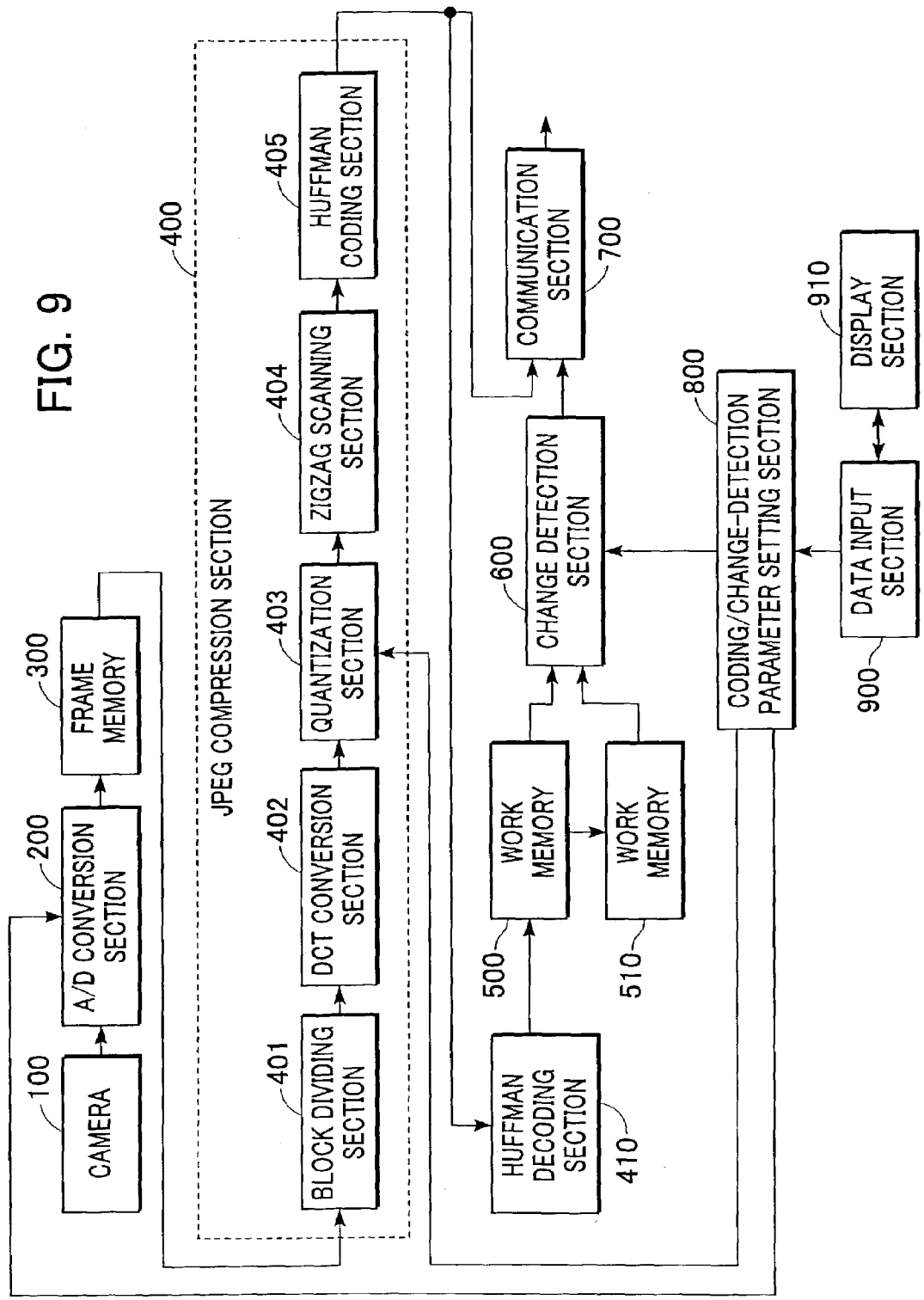
FIG. 9 is a block diagram showing a configuration of an exemplary variation of the image distribution apparatus in FIG. 1.

Most of the configuration elements of an image distribution apparatus shown by the block diagram in FIG. 9 are the same as the configuration elements of the image distribution apparatus shown by the block diagram in FIG. 1. Therefore, only a portion different from FIG. 1 will be described.

On the image distribution apparatus in FIG. 1, it has been assumed, as described above, that data output from the zigzag scanning section 404 can be output to external equipment outside the JPEG compression section 400, which is assumed to be impossible on the image distribution apparatus in FIG. 9. Accordingly, in the image distribution apparatus in FIG. 9, it is designed such that JPEG compressed data output from the JPEG compression section 400 is input to a Huffman decoding section 410 to be converted into a transformation coefficient array with a fixed length, using a Huffman decoding table (a transformation table from a variable-length code to a fixed-length code). A transformation coefficient array output from the Huffman decoding section 410 is input to a work memory 500. Other configuration and the function of each configuration element are the same as the case described with reference to FIG. 4, and description thereof is omitted.

The Huffman decoding table can be obtained by analysis of JPEG header stored in the top of the JPEG compressed data, though a JPEG header analysis section is not shown in FIG. 9 for brevity. Also, a JPEG header analysis section is not shown in the JPEG compression section 400. Details of JPEG coding and decoding are described in ISO/IEC10918-1, which is an international standard of image coding systems, and thus detailed description is omitted here.

According to the above described embodiment, reduction of development and manufacturing cost is achieved by minimizing change in an existing image distribution system, and user-desired change detection can be realized that has resistance to various disturbances and allows easy setting of a change detection objective region and other change detection parameters, using graphical user interfaces (GUIs) such as a change detection setting window and a region designation window.

Further, results of image change detection are displayed for each block, dividing a frame into blocks with a predetermined size. Block dividing used in a coding process with JPEG or others is utilized so that unnecessary increase in a processing load of an apparatus can be avoided. Still further, positions with a detected change in an image can be confirmed for each block, which enables effective confirmation.

A predetermined threshold associated with image change determination is input by a. Region designation information that designates a region of a portion, of a frame, to be an object for image change detection is input by the unit for inputting parameters.

A Second Embodiment

According to a second embodiment of the present invention, an image distribution system that allows setting parameters for image change detection from a client terminal side to an image distribution apparatus is provided.

Figure 10:
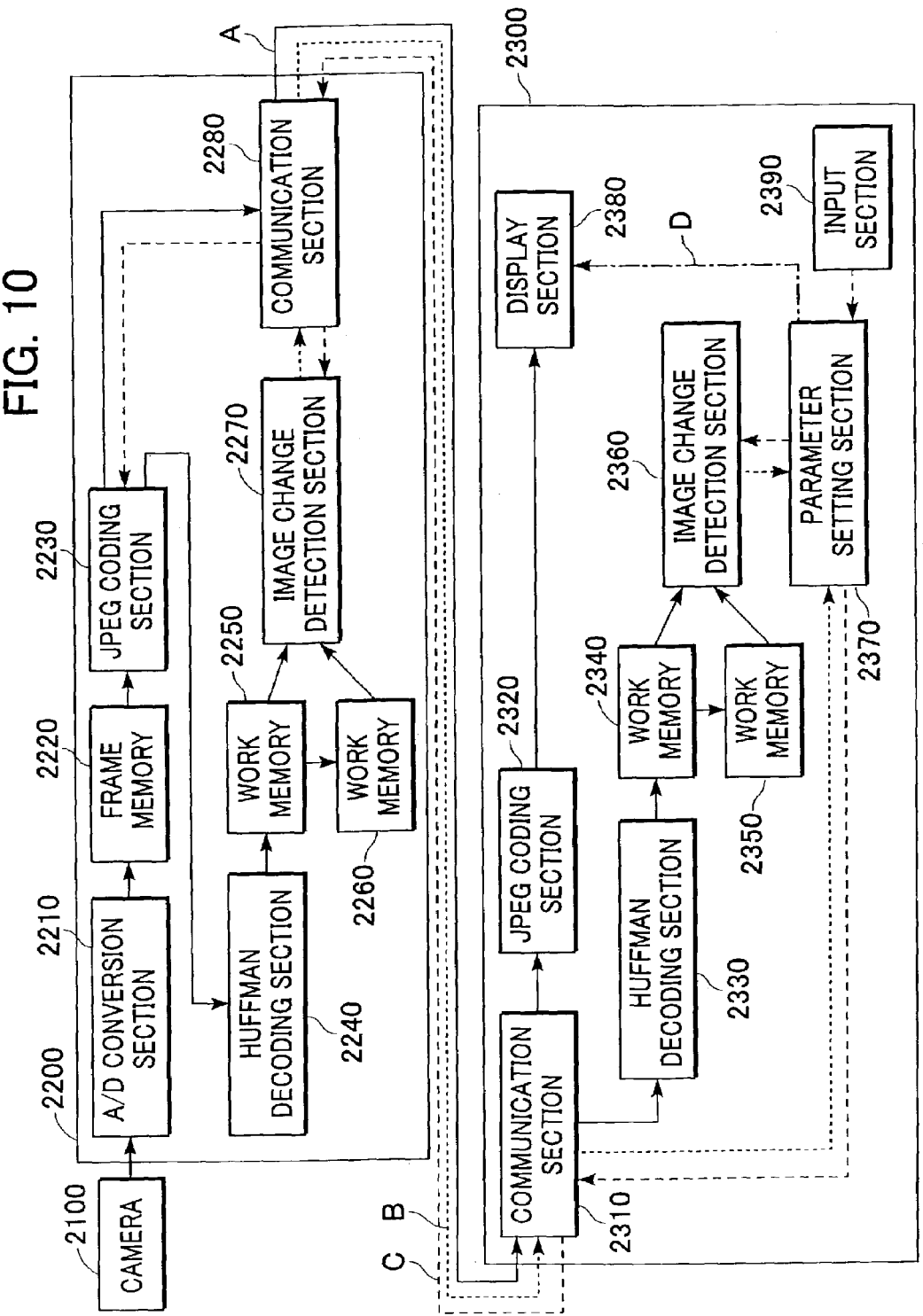
FIG. 10 is a block diagram showing a configuration of image distribution system (or a monitoring system) provided with an image change detection function according to a second embodiment of the invention.

FIG. 10 is a block diagram showing a schematic configuration of an image distribution system (a monitoring system) provided with a function of image change detection according to the present embodiment of the invention.

In FIG. 10, a camera 2100 and an image distribution apparatus 2200 are arranged on image distribution side, and a client terminal 2300 is arranged on image receiving side.

The image distribution apparatus 2200 and the client terminal 2300 are connected via a data transmission medium such as the Internet or an intranet.

A plurality of client terminals can be connected to the image distribution apparatus 2200. However, only one client terminal is shown in FIG. 10 for brevity in description. Further, either or neither the image distribution apparatus 2200 nor the client terminal 2300 are not needed to be dedicated apparatuses, making it possible to realize the system with installation of a certain software to an operation apparatus such as a PC (personal computer).

An analog video signal output from the camera 2100 is input to the image distribution apparatus 2200, converted into digital signal (image data) by an A/D conversion section 2210, and thereafter stored in a frame memory 2220.

A JPEG coding section 2230 reads out image data stored in the frame memory 2220, codes the image data into JPEG data, and then delivers the coded data to a communication section 2280 and a Huffman decoding section 2240. A coding system used here is not limited to JPEG. However, images are divided into blocks with a certain size in a JPEG system, and the present invention provides preferable embodiments, utilizing this block dividing.

The Huffman decoding section 2240 Huffman-decodes the coded data into block units with a size of 8 pixels×8 pixels, transforms the data into a DCT transformation coefficient array with a fixed-length, and then delivers the transformation coefficient array to a work memory 2250. The transformation coefficient array stored in the work memory 2250 is transferred to a work memory 2260 for each a constant period (a data renewal period of the frame memory 2220). An image change detection section 2270 carries out image change detection with similar procedures to those in FIG. 7 and FIG. 8 described in the first embodiment, using a transformation coefficient array of a current frame read out from the work memory 2250 and a transformation coefficient array of a previous frame read out from the work memory 2260, and delivers the result of image change detection to the communication section 2280.

The result of this image change detection is, for example, information indicating as to on which block of the image an image change has been detected. The communication section 2280 transmits the coded data and the result of image change detection to a client terminal 2300, according to a predetermined procedure. On the other hand, the communication section 2280 receives coding parameters and image change detection parameters from the client terminal 2300, and sets the coding parameters to the JPEG coding section 2230 and the image change detection parameters to the image change detection section 2270, according to a predetermined procedure. The JPEG coding section 2230 operates according to the set coding parameters, and the image change detection section 2270 operates according to the set parameters for image change detection.

In the client terminal 2300, a communication section 2310 receives the coded data and the result of the image change detection, according to a predetermined procedure. The coded data is delivered to a JPEG decoding section 2320, decoded to image data, and displayed on a display section 2380.

The coded data is also delivered to a Huffman decoding section 2330, Huffman decoded into block units with a size of 8 pixels×8 pixels, and transformed into an DCT transformation coefficient array with a fixed-length. This transformation coefficient array is delivered to a work memory 2340. The transformation coefficient array stored in the work memory 2340 is transmitted to a work memory 2350 just before a next transformation coefficient array is input. An image change detection section 2360 carries out image change detection, using the transformation coefficient array of the current frame read out from the work memory 2340 and the transformation coefficient array of the previous frame read out from the work memory 2350, according to the procedures in FIG. 7 and FIG. 8 described in the first embodiment, and delivers detailed information on the result of image change detection to parameter setting section 2370.

The result of image change detection received by the communication section 2310 is also delivered to the parameter setting section 2370. The parameter setting section 2370 confirms that there is no contradiction between the result of image change detection delivered from the communication section 2310 and the result of image change detection delivered from the image change detection section 2360, which makes it possible to confirm that the image distribution apparatus 2220 and the client terminal 2300 are using the same image change detection function.

Further, the parameter setting section 2370 displays a GUI (Graphical User Interface) for input of coding parameters and parameters for image change detection as shown in FIG. 3 and FIG. 6 described in the first embodiment on a display section 2380, and receives coding parameters and parameters for image change detection that user input from an input section 2390. In the GUI that the parameter setting section 2370 displays on the display section 2380, detailed information on the result of image change detection that has been input from the image change detection section 2360 is also displayed. Accordingly, user can grasp the relationship between the set value of the image change detection parameters and the result of image change detection in detail instantly.

In FIG. 10, the continuous line A shows the flow of the image data or the coded data, the dotted line B shows the flow of the result of image change detection, the broken line C shows the flow of the parameters for image change detection, and the alternate long and short dash line D shows the flow of the GUI data.

In the description above, a detection unit for detecting image change may be arranged either in the image distribution apparatus 2200 or in the client terminal 2300 on the image receiving side. In other words, the image distribution apparatus only performs photographing according to parameters, and distributes the image to the client terminal. Accordingly, the client terminal may perform change detection, using this image.

With the configuration mentioned above, at least one client terminal is provided with a detection unit for detecting image change. However, it should not be misunderstood that the image distribution apparatus is not needed to be provided with a detection unit for detecting image change. This is because even though the image distribution apparatus can be connected to a plurality of client terminals, it does not mean that all the client terminals are provided detection units for detecting image change. Therefore, the image distribution apparatus would be better provided with a detection unit for detecting image change in order to transmit results of image change detection to the client terminals.

As described above, according to the second embodiment of the invention, parameters for image change detection applied to a detection unit for detecting image change provided to a client terminal can be transmitted from the client terminal to an image distribution apparatus, thus enabling remote setting of parameters for image change detection of the image distribution apparatus. The client terminal also can operate a remote parameter setting unit upon instruction by user.

Further, while user inputs parameters for image change detection, a result of a process by the detection unit for detecting image change or an intermediate result of the process can be displayed to the user.

Thus, the user can see detailed information such as information on changes between frames in a unit of block in real time, which produces an effect of providing an image distribution system that allows user to find quickly optimum parameters for image change detection.

A Third Embodiment

According to a third embodiment of the invention, an image distribution system that all the time provides detailed image change information to users, synchronizing with image data and independently on the timing of transmitting the image data, is provided.

Figure 11:
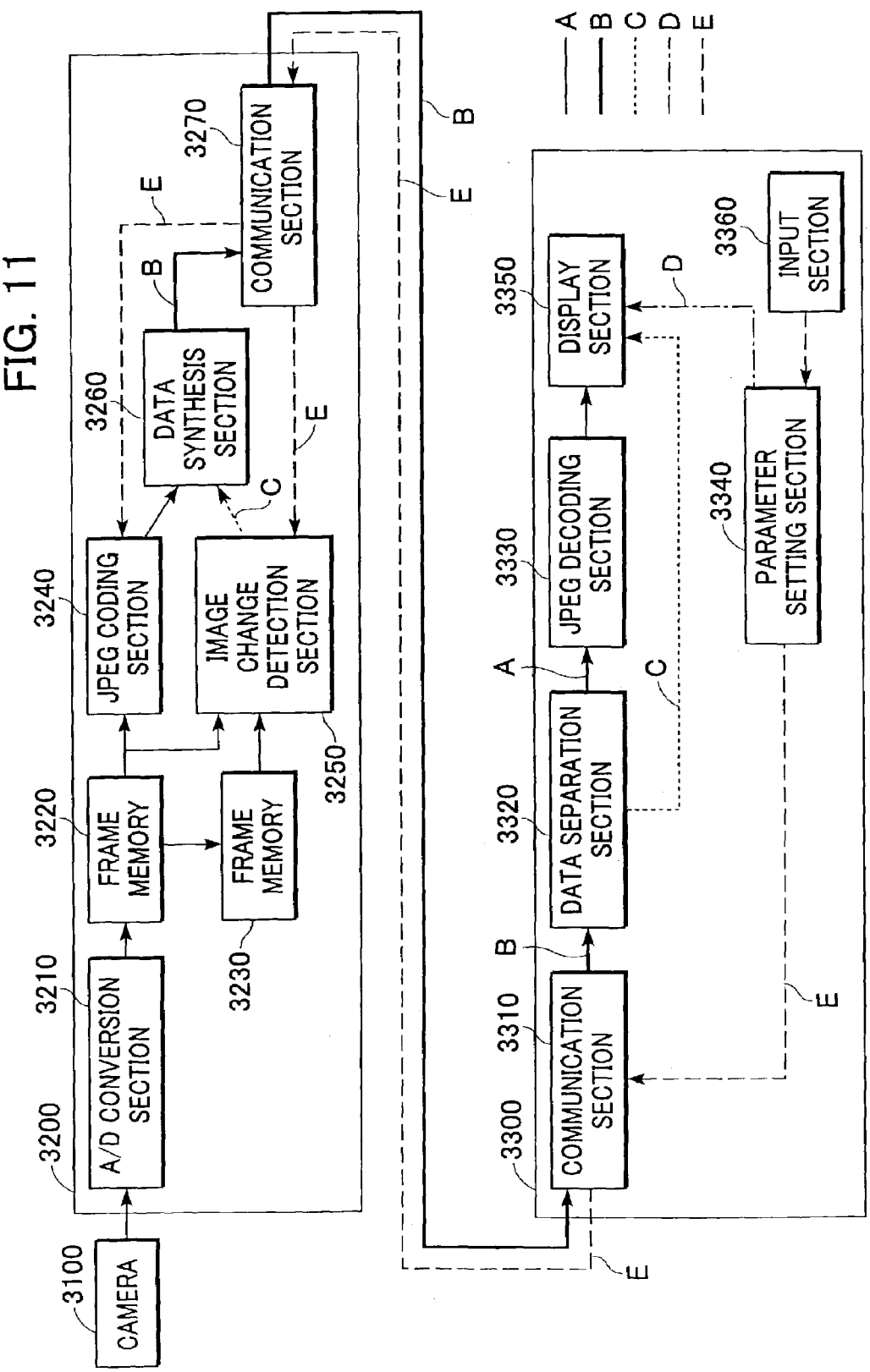
FIG. 11 is a block diagram showing a configuration of an image distribution system (or a monitoring system) provided with an image change detection function according to a third embodiment of the invention.

FIG. 11 is a block diagram showing the configuration of an image distribution system (or a monitoring system) provided with a function of image change detection according to the third embodiment of the invention. With this configuration, user can set parameters for image change detection of the image distribution apparatus from a client terminal as well as in the second embodiment.

In FIG. 11, a camera 3100 and an image distribution apparatus 3200 are arranged on image transmitting side, and a client terminal 3300 is arranged on image receiving side. The image distribution apparatus 3200 and the client terminal 3300 are connected via a data transmission medium such as the Internet or an intranet. A plurality of client terminals can be connected to the image distribution apparatus 3200. However, only one client terminal is shown in FIG. 11 for brevity in description. Further, either or neither the image distribution apparatus 3200 nor the client terminal 3300 are not needed to be dedicated apparatuses, making it possible to realize the system with installation of a certain software to an operation apparatus such as a PC (personal computer).

An analog signal output from the camera 3100 is input to the image distribution apparatus 3200, and converted into a digital signal (image data) by an A/D conversion section 3210, and then stored in a frame memory 3220. A JPEG coding section 3240 reads out image data stored in the frame memory 3220, codes the data into JPEG data, and delivers the coded data to a data synthesizing section 3260. The image data stored in the frame memory 3220 is transferred to the frame memory 3230 for each constant period (frame memory renewal period). An image change detection section 3250 compares current image data read out from the frame memory 3220 and previous image data read out from the frame memory 3230 to carry out image change detection, and delivers detailed image change information as shown in FIG. 13 to the data synthesizing section 3260. This image change detection determines images on each predetermined unit of blocks that divides the images.

Image change information is configured with a signal for each block with a predetermined size that divides an image, wherein each signal is 0 or 1 depending on the presence of a detected change in each block. In the present embodiment, 1 is given to a block with a detected change.

The data synthesizing section 3260 stores coded data for the latest single frame delivered from the JPEG coding section 3240 and image change information for a single or plural frames delivered from the image change detection section 3250, but disposes coded data for past frames. Upon receipt of a request from the communication section 3270 for transmission of synthesized data, the data synthesizing section 3260 synthesizes the stored coded data for a single frame with the stored image change information for a single or plural frames to form synthetic data, and deliver the synthetic data to the communication section 3270, deleting all the stored coded data and image change information. There are two methods of forming synthetic data as follows, and whichever may be employed.

(I) Use an application marker of JPEG data, and insert image change information into the header section of the coded data.

(II) Define an original data format in advance, and synthesize data according to this definition.

Figure 12:
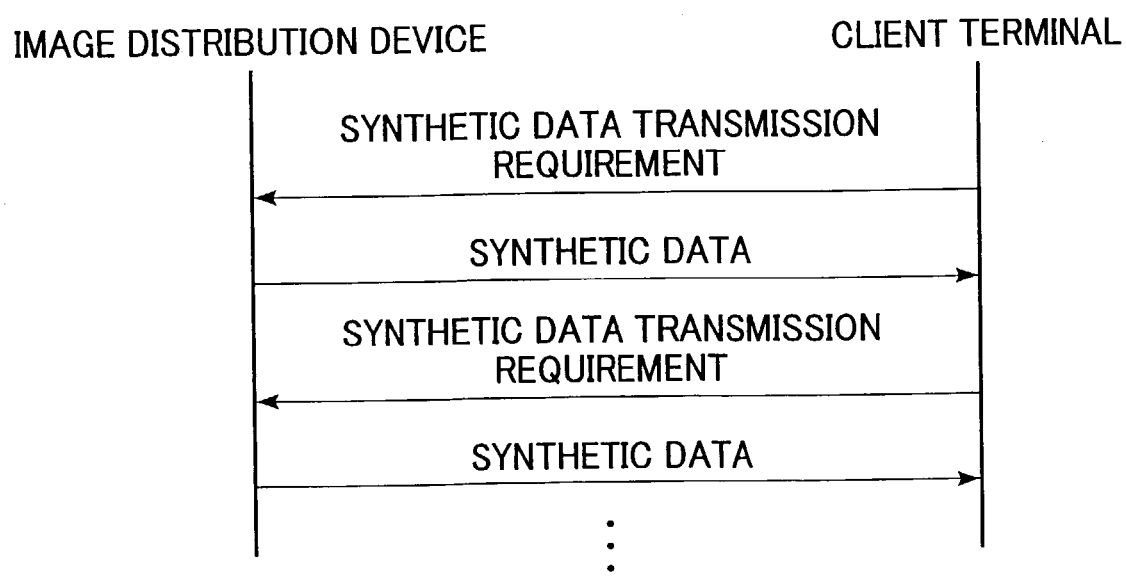
FIG. 12 is a diagram illustrating a procedure of transmitting synthetic data in the image distribution apparatus according to the invention.

The communication section 3270 transmits the synthetic data to the client terminal 3300, according to a predetermined procedure as shown in FIG. 12. Further, the communication section 3270 receives coding parameters and parameters for image change detection from the client terminal 3300, according to a predetermined procedure, thereafter sets the coding parameters to the JPEG coding section 3240, and sets the parameters for image change detection to the image change detection section 3250. The JPEG coding section 3240 operates according to the set coding parameters, and the image change detection section 3250 operates according to the set parameters for image change detection.

Figure 15:
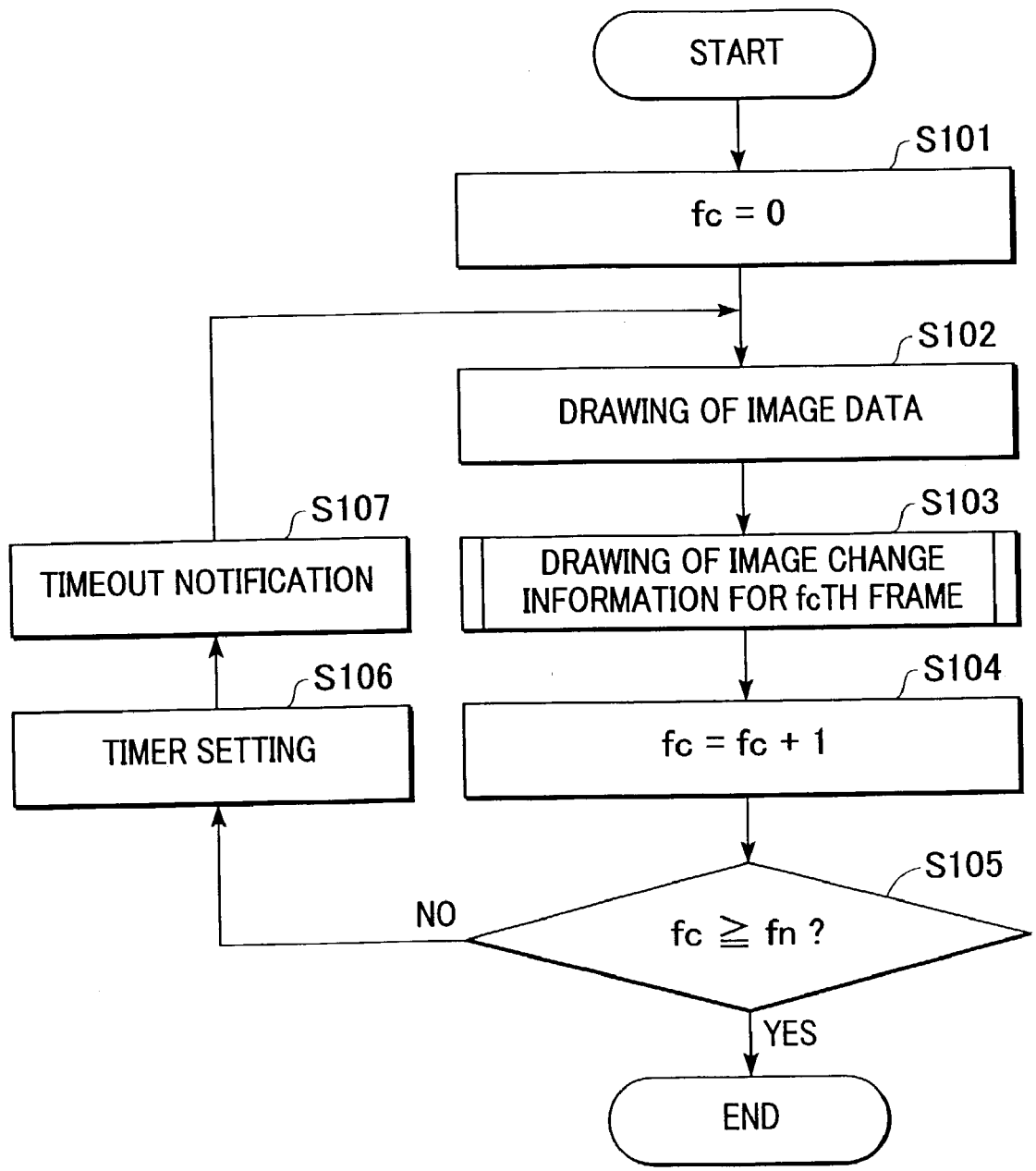
FIG. 15 is a flowchart showing a procedure to display image change information for a plurality of frames.

In the client terminal 3300, a communication section 3310 receives the synthetic data, according to a predetermined procedure. The synthetic data is delivered to a data separation section 3320, and separated into coded data for a single frame and image change information for single or plural frames. The coded data for a single frame is delivered to a JPEG decoding section 3330, decoded into image data, and displayed on a image display section 3350. On the other hand, the information for single or plural frames is processed by a central processing section, not shown, and displayed as a geometrical figure on the display section 3350, according to procedures as shown in FIG. 15 and FIG. 19. A parameter setting section 3340 displays a GUI (Graphical User Interface) for input of coding parameters and parameters for image change detection, and then receives coding parameters and parameters for image change detection after user inputs the parameters from an input section 3360. These parameters are delivered to the communication section 3310, and transmitted to the image distribution apparatus 3200, according to a predetermined procedure.

In FIG. 11, the continuous thin line A shows the flow of the image data or the coded data, the continuous thick line B shows the flow of the synthetic data, the dotted line C shows the flow of the image change information, the broken line E shows the flow of the coding parameters and parameters for image change detection, and the alternate long and short dash line D shows the flow of GUI data.

FIG. 12 is a diagram for illustrating the transmission procedure of synthetic data in an image distribution apparatus according to the present invention.

As shown in FIG. 12, first, a request for transmission of synthetic data is transmitted from the client terminal 3300, and in response thereto, the image distribution apparatus 3200 transmits the latest synthetic data. After receiving the synthetic data, the client terminal 3300 transmits a request for transmission of the next synthetic data.

FIG. 13 is a diagram for illustrating image change information for a single frame.

In FIG. 13, the entire rectangular on the left side shows a frame, and each small rectangular is a block with a predetermined size obtained by dividing the frame.

Blocks in FIG. 13 correspond to processing blocks for JPEG coding. Thus, it eliminates the labor of dividing the frame into blocks for results of detection.

A block number is assigned to each block. In this example, 10 blocks are included in X axis direction, and 8 blocks in Y axis direction.

The image change detection section 3250 calculates presence of image change in a unit of block, gives bit 1 to each block with image change and bit 0 to each block with no image change, and arranges all the bits in order of block number, thereby generating image change information.

Even as fixed-length data as it is, the image change information generated as described above may be synthesized with coded data. However, it may also be compressed in the data synthesizing section 3260 by entropy coding such as run-length coding and stored, and then synthesized as variable-length data with the coded data. Thus, even when the image data is large, the image change information is large, or the capacity allocated to the header of the image is small, the synthesized data can be recordable well enough. Particularly, when the number of frames of image change information to be synthesized at a time is large, this method is effective.

In case of entropy coding the image change information in the data synthesizing section 3260, the image change information obtained as variable-length data in the data separation section 3320 is needed to be entropy decoded to be reproduced as a fixed-length bit string.

Figure 14:
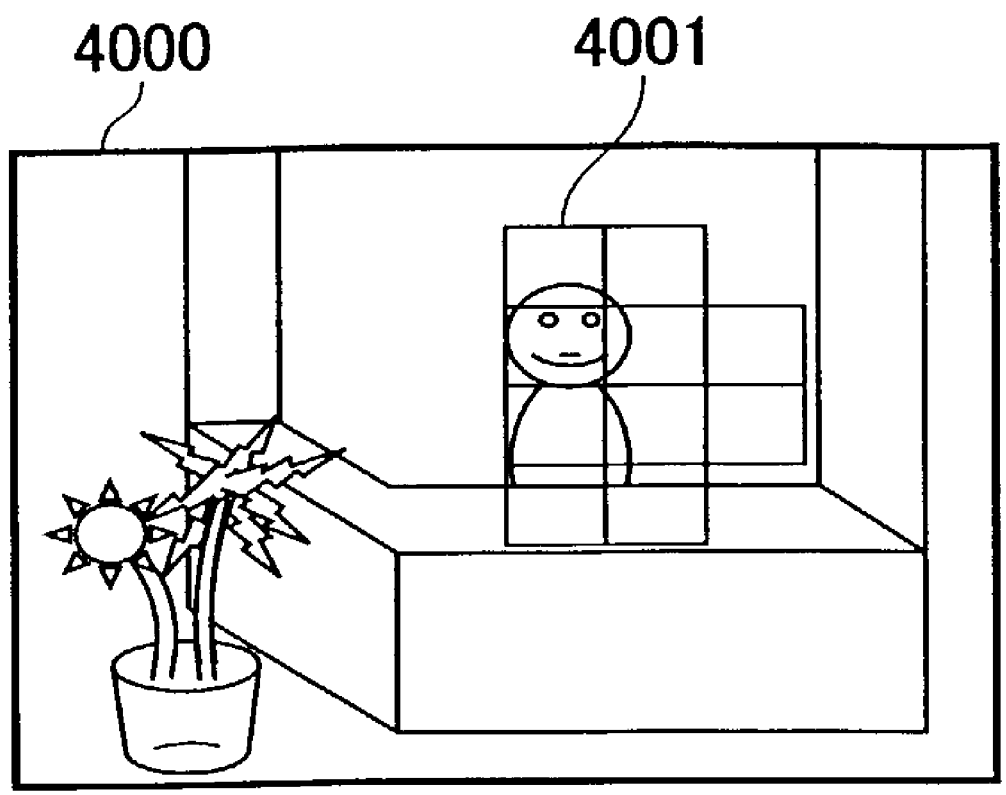
FIG. 14 is an exemplary display of image data and image change information displayed on a display section 3350 in FIG. 11.

FIG. 14 is an exemplary display of image data and image change information displayed on the display section 3350. In FIG. 14, rectangular frame lines 4001 are drawn showing a plurality of change detection blocks (blocks with image change) as image change information on an image 4000.

FIG. 15 is a flowchart showing a procedure for displaying image change information for a plurality of frames. The number of frames of the image change information included in the synthesized data is denoted by fn, and a frame counter of the current image change information that indicates the position counted from the top frame is denoted by fc, wherein fc is effective in a range of 0 to fn−1.

In FIG. 15, fc is initialized to 0 in step S101. Next, in step S102, image data for a single frame is drawn on the display section 3350. Thus, image data and image change information drawn previously are all deleted.

In step S103, image change information for fc-th frame is drawn in the display section 3350. Details of the step S103 will be described later with reference to FIG. 16.

In step S104, 1 is added to fc, and in step S105, it is determined whether fc has reached fn. If fc is equal to or greater than fn, it means that image change information for all frames has already been drawn, and accordingly, the process is terminated. If fc is less than fn, then the procedure proceeds to step S106 to set a timer, and interrupts the process. At this time, the time (second) to be set to the timer may well be a little shorter than the value of the average data amount (bit) of coded data for a single frame divided by the average transfer speed (bit/second) of the data transmission medium. However, the average data amount of coded data for a single frame or the average transfer speed of the data transmission medium cannot be obtained before measuring them for a certain time. Therefore, a certain predetermined time may well be set before these values are obtained.

When timeout is notified by the timer in step S107, the procedure proceeds back to the step S102. By the above described process, image change information for fn frames on image data for a single frame is displayed, being switched in time series.

Figure 16:
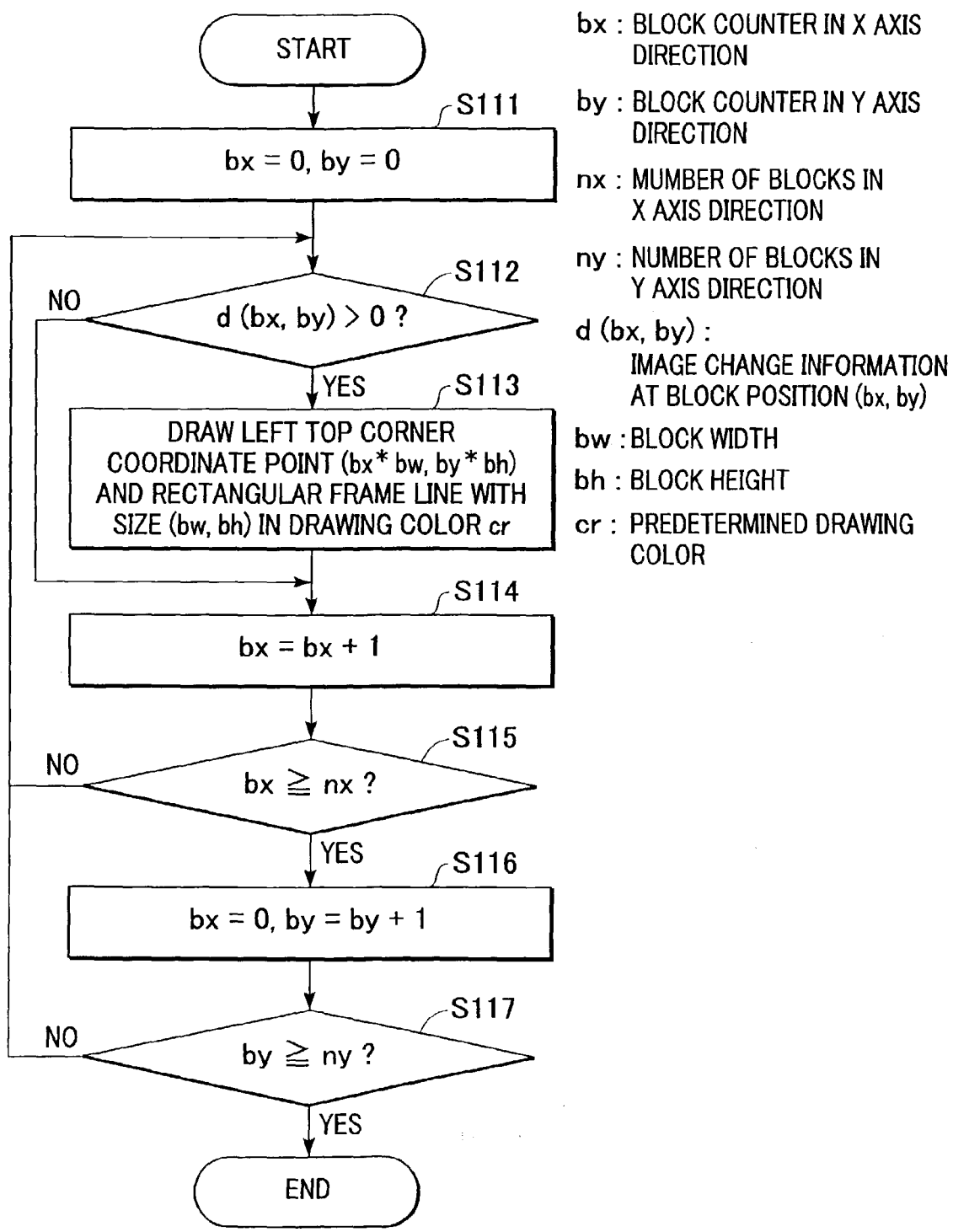
FIG. 16 is a flowchart showing a procedure to display image change information for a single frame.

FIG. 16 is a flowchart showing a procedure for displaying image change information for a single frame. In this flowchart, the number of blocks in X axis direction included in a single frame is denoted by nx, the number of blocks in Y axis direction is denoted by ny, a block counter in X axis direction that shows the position of a block in X axis direction from a top block is denoted by bx, a block counter in Y axis direction that shows the position of a block in Y axis direction from a top block is denoted by by, image change information at a block position (bx, by) is denoted by d (bx, by), a block width is denoted by bw, a block height is denoted by bh, and a predetermined drawing color is denoted by cr, wherein bx is effective in a range of 0 to nx−1, and by is effective in a range of 0 to ny−1.

In FIG. 16, in step S111, both bx and by are initialized to 0. Next, in step S112, it is determined whether d (bx, by) is greater than 0 (0 or 1), and if d (bx, by) is greater than 0 (namely 1), then the procedure proceeds to step S113 because there has been a change in the block, and if d (bx, by) is equal to or less than 0 (namely 0), then the procedure proceeds to step S114 because there has been no change in the block.

In step S113, a rectangular frame lines showing a change detected block at the block position (bx, by) are drawn in a drawing color cr, and the procedure thereafter proceeds to step S114. X coordinate at the left top corner of the rectangular is obtained as bx multiplied by bw, and Y coordinate is obtained as by multiplied by bh. The width of the rectangular is bw, and the height is bh. The drawing color cr of the rectangular is decided in advance by a side that calls the process procedure in FIG. 16.

In step S114, 1 is added to bx, and in step S115, it is determined whether bx has reached nx. If bx is equal to or greater than nx, it means that all blocks (one block line) that correspond to the current by have been processed, and accordingly the procedure proceeds to step S116. If bx is less than nx, then the procedure proceeds back to the step S112.

In step 116, 0 is given to bx, 1 is added to by, and then the procedure proceeds to step S117. In the step S117, it is determined whether by has reached ny. If by is equal to or greater than ny, it means all blocks have been processed, and accordingly the process is terminated. If by is less than ny, then the procedure proceeds back to the step S112. By the process described above, image change information for a single frame is displayed.

Figure 17:
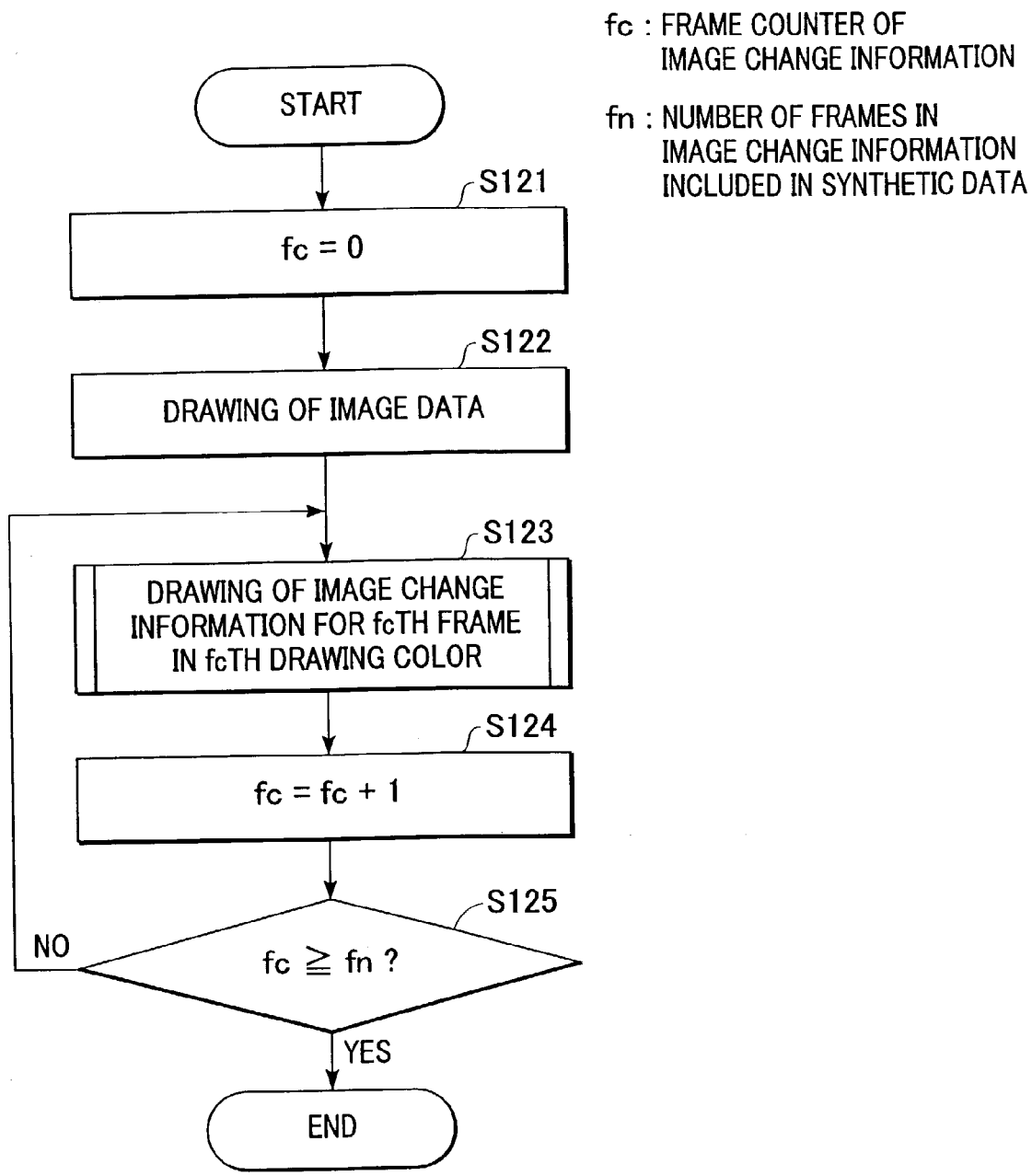
FIG. 17 is another flowchart showing a procedure to display image change information for a plurality of frames.

FIG. 17 is a flowchart that shows a procedure for displaying image change information for a plurality of frames. The number of frames of the image change information included in the synthetic data is denoted by fn, and a frame counter of the current image change information that indicates the position counted from the top frame is denoted by fc, wherein fc is effective in a range of 0 to fn−1.

In FIG. 17, in step S121, fc is initialized to 0. In step S122, pixel data for a single frame is drawn on the display section 3350. In step S123, image change information for the fc-th frame is drawn in the predetermined fc-th drawing color on the display section 3350. The detailed procedure of the process in step S123 is the same as that shown in FIG. 16.

In step 124, 1 is added to fc, and in step S125, it is determined whether fc has reached fn. If fc is equal to or greater than fn, it means that image change information for all frames has already been drawn, and accordingly the process is terminated. If fc is less than fn, the procedure proceeds back to the step S123. By the process described above, image change information for fn frames on image data for a single frame is displayed in each different color. Drawing proceeds from image change information for the oldest frame in turn. Therefore, in a block in which change has occurred on a plurality of frames, the display is overdrawn by image change information for a newer frame.

Figure 18:
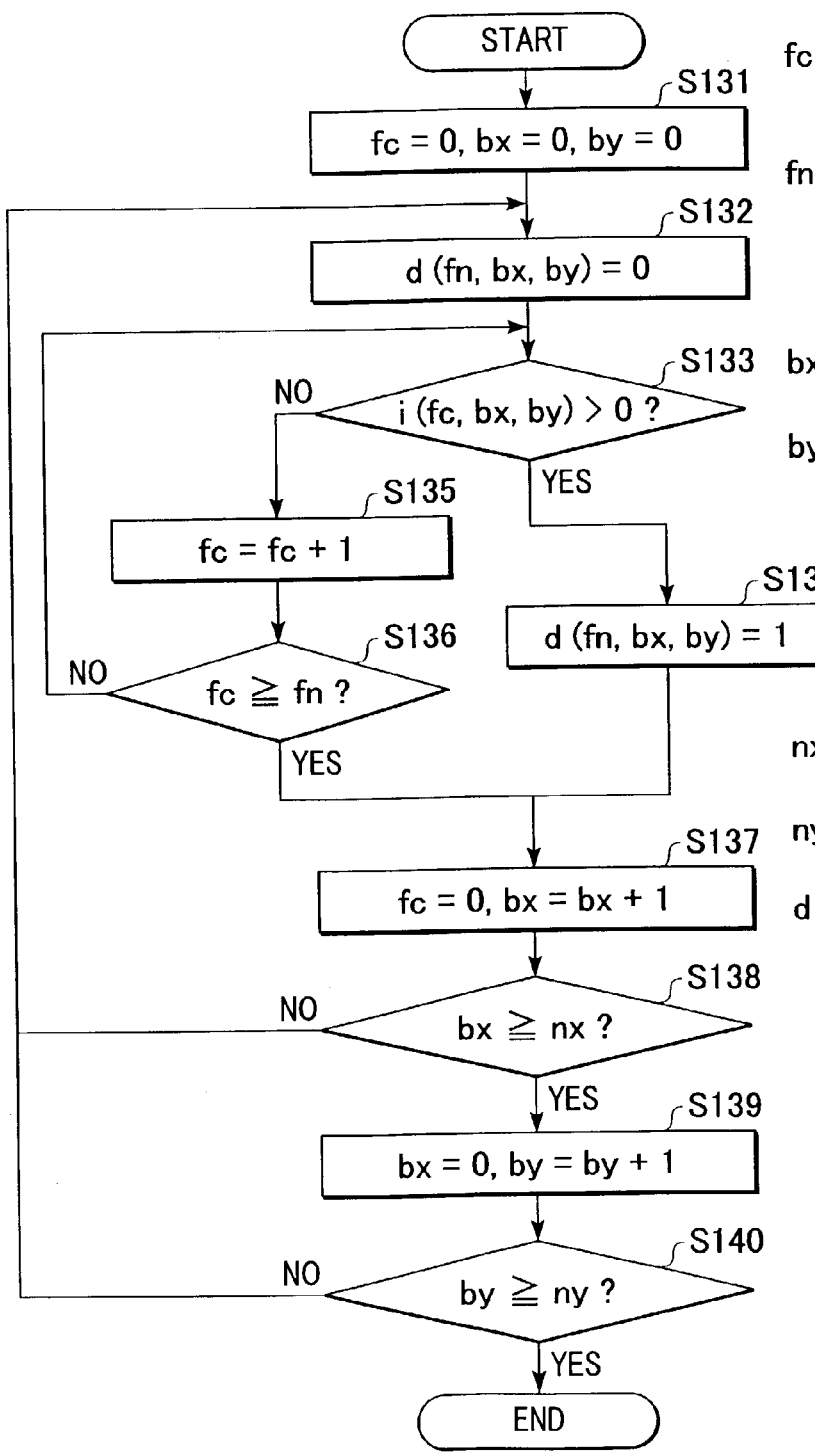
FIG. 18 is a flowchart showing preprocessing prior to a procedure to display image change information for a plurality of frames according to another embodiment of the invention.

FIG. 18 is a flowchart showing preprocessing prior to another procedure to display image change information for a plurality of frames. The number of frames of the image change information included in the synthetic data is denoted by fn, and a frame counter of the current image change information that indicates the position counted from the top frame is denoted by fc, the number of blocks in X axis direction included in a single frame is denoted by nx, the number of blocks in Y axis direction is denoted by ny, a block counter in X axis direction that shows the position of a block in X axis direction from a top block is denoted by bx, a block counter in Y axis direction that shows the position of a block in Y axis direction from a top block is denoted by by, and image change information at a block position (bx, by) for the fc-th frame is denoted by d (fc, bx, by), wherein fc is effective in a range of 0 to fn−1, bx is effective in a range of 0 to nx−1, and by is effective in a range of 0 to ny−1.

In FIG. 18, in step S131, fc, bx, and by are all initialized to 0. In step S132, d (fc, bx, by) is initialized to 0.

Next, in step S133, it is determined whether d (fc, bx, by) is greater than 0 (0 or 1), and if d (fc, bx, by) is greater than 0 (namely 1), then the procedure proceeds to step S134 because there has been a change in the block, and if d (fc, bx, by) is equal to or less than 0 (namely 0), then the procedure proceeds to step S135 because there has been no change in the block.

In the step 134, 1 is given to d (fc, bx, by), and the procedure proceeds to step S137. In the step S135, 1 is added to fc, and in step S136, it is determined whether fc has reached fn. If fc is equal to or greater than fn, it means that image change information for all frames at the block position (bx, by) have been checked, and accordingly the procedure proceeds to the step S137. If fc is less than fn, then the procedure proceeds back to the step S133.

In the step 137, 0 is given to fc, 1 is added to bx, and the procedure proceeds to step S138. In step S138, it is determined whether bx has reached nx. If bx is equal to or greater than nx, it means that all blocks (one block line) that correspond to the current by have been preprocessed, and accordingly the procedure proceeds to step S139. If bx is less than nx, then the procedure proceeds back to the step S132.

In the step 139, 0 is given to bx, 1 is added to by, and the procedure proceeds to step S140. In the step S140, it is determined whether by has reached ny. If by is equal to or greater than ny, it means that all blocks have been preprocessed, and accordingly the preprocessing is terminated. If by is less than ny, then the procedure proceeds back to the step S132.

By the preprocess described above, image change information is added for a single frame, and image change information for fn+1 frames are obtained. Thereafter, when 1 is added to fn and the process shown in FIG. 20 is executed, image change information for a plurality of frames on image data for a single frame is displayed in each different display color. When there has been image change in a same position of a plurality of frames, a still different display color is used (drawing in a display color for the lastly added image change information).

FIG. 19 is a flowchart showing preprocessing prior to another procedure to display image change information for a plurality of frames. The number of frames of the image change information included in the synthetic data is denoted by fn, and a frame counter of the current image change information that indicates the position counted from the top frame is denoted by fc, the number of blocks in X axis direction included in a single frame is denoted by nx, the number of blocks in Y axis direction is denoted by ny, a block counter in X axis direction that shows the position of a block in X axis direction from a top block is denoted by bx, a block counter in Y axis direction that shows the position of a block in Y axis direction from a top block is denoted by by, image change information at a block position (bx, by) for the fc-th frame is denoted by d (fc, bx, by), and image change information of multiple values at the block position (bx, by) obtained from a plurality of frames is denoted by dm (bx, by), wherein fc is effective in a range of 0 to fn−1, bx is effective in a range of 0 to nx−1, and by is effective in a range of 0 to ny−1.

In FIG. 19, in step S151, fc, bx, and by are all initialized to 0. In step S152, dm (bx, by) is initialized to 0. In step S153, d (fc, bx, by) is added to dm (bx, by), and 1 is added to fc.

In step S154, it is determined whether fc has reached fn. If fc is equal to or greater than fn, it means that image change information of all frames at the block position (bx, by) is added, and accordingly the procedure proceeds to step S155. If fc is less than fn, then the procedure proceeds back to the step S153.

In the step 155, 0 is given to fc, 1 is added to bx, and the procedure proceeds to step S156. In the step S156, it is determined whether bx has reached nx. If bx is equal to or greater than nx, it means that all blocks (one block line) that correspond to the current by have been preprocessed, and accordingly the procedure proceeds to step S157. If bx is less than nx, then the procedure proceeds back to the step S152.

In the step S157, 0 is given to bx, 1 is added to by, and the procedure proceeds to step S158. In the step S158, it is determined whether by has reached ny. If by is equal to or greater than ny, it means that all blocks have been preprocessed, and accordingly the preprocessing is terminated. If by is less than ny, the procedure proceeds back to the step S152.

By the preprocess described above, image change information of multiple values is obtained in such a manner that a plurality of pieces of image change information are added for each block position. When a similar process to the process shown in FIG. 16 is executed giving each different display color to each value of this image change information of the multiple values or each range of values, the image change information is displayed in different colors according to the result of adding image change information for a plurality of frames on image data for a single frame.

According to the above described third embodiment of the invention, image change information for a plurality of frames on image data for a single frame can be displayed, synchronizing receiving images with detection results.

When image data for a single frame and image change information for a plurality of frames are obtained by the data separation section, image change information for the plurality of frames is displayed being switched in time series (For example, only image change information is renewed to be displayed like a dynamic image.) while the image data for the single frame is displayed, thereby enabling recognition of change information that corresponds with elapse of time.

When image data for a single frame and image change information for a plurality of frames are obtained by the data separation section, image change information for a plurality of frames on image data for a single frame is displayed at the same time being superimposed. Accordingly, even when the frame rate of images is low, change detection information is recognizable with a high frame rate. This is effective in giving priority to change detection information.

In displaying image change information for a plurality of frames being superimposed at the same time, each different display color is used for image change information for each frame, and the image change information is drawn from the oldest frame in turn only at positions where there has been image change. Accordingly, recognition of change information that corresponds to elapse of time is realized.

Also in displaying image change information for a plurality of frames being superimposed at the same time, each different display color is used for image change information for each frame, and further, when there have been image changes at same positions for a plurality of frames, still different colors are used at such positions. Accordingly, recognition of change information that corresponds to elapse of time is realized, and further it is easier to recognize the positions where changes have been detected with concentration.

Further, in displaying image change information for a plurality of frames being superimposed at the same time, image change information for each frame is added at each same position, and each different color is used according to each different result of addition. Accordingly, recognition of change information that corresponds to elapse of time is realized, and further it is easier to recognize the positions where changes have been detected with concentration.

The present invention may be applied to a system comprised of a plurality of devices (such as a host computer, an interface apparatus, a reader, a printer), and may be applied to an apparatus comprised of a single device (such as a copy machine, a facsimile device).

It is to be understood that the functions according to the above described embodiments of the present invention may be implemented by providing a computer, in an apparatus or in a system which is connected to various devices, with a program code of software that realizes the functions according to the above described embodiments so that these various devices operate according to the program stored in the computer (a CPU or MPU).

In this case, the program code itself of the above described software implements the functions according to the above described embodiments. Accordingly, the program code itself and a unit for providing the program code to a computer, for example, a storage medium storing the program code constitute the present invention.

As a storage medium for storing such a program code, for example, a floppy disk, a hard disk, an optical disk, an optical magnetic disk, a CD-ROM, a magnetic tape, a non-volatile memory card, a ROM, or the like may be used.

The functions according to the above described embodiments not only can be realized in such a manner that a computer executes a provided program code, but also can be realized by the program code coworking with an OS (operating system) running on the computer or another application software or the like. In both cases, it is to be understood that such a program code is included in embodiments according to the present invention.

Further, it is to be understood that the present invention also includes the case that a program code is provided and stored in a function expansion board of a computer or stored in a memory arranged in a function expansion unit connected to the computer, thereafter a part or all of actual processes is performed by the function expansion board, or a CPU mounted to the function expansion unit, or the like, according to instructions by the program code, and thus the functions according to the aforementioned embodiments are accomplished.

In other words, the foregoing description of embodiments has been given for illustrative purposes only and not to be construed as imposing any limitation in every respect.

The scope of the invention is, therefore, to be determined solely by the following claims and not to limited by the text of the specifications and alterations made within a scope equivalent to the scope of the claims fall within the true sprit and scope of the invention.

What is claimed is:

1. An image distribution apparatus that divides image data for a single frame into a plurality of blocks, orthogonally transforms the blocks and calculates transformation coefficients, quantizes the calculated transformation coefficients, codes the quantized transformation coefficients, and distributes the coded image data to an external apparatus, comprising:
   a) an acquiring unit for acquiring the quantized transformation coefficients;
   b) a storage unit for storing the quantized transformation coefficients acquired by said acquiring unit;
   c) a calculation unit for calculating differences between quantized transformation coefficients of a first frame stored in said acquiring unit and quantized transformation coefficients of a second frame stored in said acquiring unit;
   d) a changing block count unit for counting the number of blocks whose difference values calculated by said calculation unit are equal to or greater than a predetermined value, as changing blocks of the first frame; and
   e) a detection unit for detecting a changing frame by determining that the first frame has changed when the number of blocks counted by the changing block count unit is equal to or greater than a predetermined value.

2. An image distribution apparatus according to claim 1, further comprising:
   a distribution unit for distributing a result of detection by said detection unit to the external apparatus together with the coded image data.

3. An image distribution apparatus according to claim 1, wherein
   said calculation unit weights each difference of the transformation coefficients calculated for each image component, and calculates a sum of the differences of transformation coefficients for each weighted image component.

4. An image distribution apparatus according to claim 1, wherein
   said calculation unit calculates differences between the transformation coefficients of the first frame and the transformation coefficients of the second frame by weighting the transformation coefficients differently for each order.

5. An image distribution apparatus according to claim 1, wherein
   said calculation unit calculates differences between transformation coefficients of the first frame and transformation coefficients of the second frame, using only transformation coefficients of a predetermined order.

6. An image distribution apparatus according to claim 1, further comprising:
   a designation unit for designating a partial region in a frame image; and a setting unit for applying said calculation unit and said changing block count unit only within the partial region designated by the designation unit.

7. An image distribution apparatus according to claim 1, further comprising:
a block selection unit for selecting blocks in a frame image; and
a setting unit for applying said calculation unit and said changing block count unit only to blocks selected by said block selection unit.

8. An image distribution apparatus according to claim 1, further comprising:
an input unit for inputting a detection parameter in detecting image change; and
a setting unit for setting a calculation process by said calculation unit, according to the detection parameter input by said input unit.

9. An image distribution apparatus according to claim 1, further comprising:
an input unit for inputting a detection parameter in detecting image change; and
a setting unit for setting a count process by said changing block number count unit, according to the detection parameter input by said input unit.

10. An image distribution apparatus according to claim 1, further comprising:
an input unit for inputting a detection parameter in detecting image change; and
a setting unit for setting a detection process by said detection unit, according to the detection parameter input by said input unit.

11. An image distribution apparatus according to claim 1, further comprising:
an input unit for inputting a coding parameter that changes a quantization characteristic in quantizing the transformation coefficients; and
a setting unit for setting a count process by said changing block number count unit, according to the coding parameter input by said input unit.

12. An image distribution apparatus according to claim 1, further comprising:
a determination unit for determining that a predetermined number of frames have continuously changed.

13. An image distribution apparatus that divides image data of a single frame into a plurality of blocks, orthogonally transforms the blocks and calculates transformation coefficients, quantizes the calculated transformation coefficients, codes the quantized transformation coefficients, and distributes the coded image data to an external apparatus, comprising:
a) a decoding unit for decoding the coded transformation coefficients;
b) a storage unit for storing the decoded transformation coefficients;
c) a calculation unit for calculating differences between transformation coefficients of a first frame and transformation coefficients of a second frame stored in said storage unit;
d) a changing block count unit for counting the number of blocks whose difference values calculated by said calculation unit are equal to or greater than a predetermined value, as changing blocks of the first frame; and
e) a detection unit for detecting a changing frame by determining that the first frame has changed when the number of blocks counted by the changing block count unit is equal to or greater than a predetermined value.

14. An image distribution apparatus according to claim 13, further comprising:
a distribution unit for distributing a result of detection by said detection unit to the external apparatus together with the coded image data.

15. A control method for an image distribution apparatus that divides image data of a single frame into a plurality of blocks, orthogonally transforms the blocks and calculates transformation coefficients, quantizes the calculated transformation coefficients, codes the quantized transformation coefficients, and distributes the coded image data to an external apparatus, comprising:
a) an acquiring process of acquiring the coded transformation coefficients;
b) a storage process of storing the transformation coefficients acquired by the acquiring process;
c) a calculation process of calculating differences between transformation coefficients of a first frame and transformation coefficients of a second frame stored by said storage process;
d) a changing block count process of counting the number of blocks whose difference values calculated by said calculation process are equal to or greater than a predetermined value, as changing blocks of the first frame; and
e) a detection process of detecting a changing frame by determining that the first frame has changed when the number of blocks counted by the changing block count process is equal to or greater than a predetermined value.

16. A storage medium storing a program for execution of each process constituting the control method described in claim 15 by a computer.

17. A control method for an image distribution apparatus that divides image data of a single frame into a plurality of blocks, orthogonally transforms the blocks and calculates transformation coefficients, quantizes the calculated transformation coefficients, codes the quantized transformation coefficients, and distributes the coded image data to an external apparatus, comprising:
a) a decoding process of decoding the coded transformation coefficients;
b) a storage process of storing the decoded transformation coefficients;
c) a calculation process of calculating differences between transformation coefficients of a first frame and transformation coefficients of a second frame stored by said storage process;
d) a changing block count process of counting the number of blocks whose difference values calculated by said calculation process are equal to or greater than a predetermined value, as changing blocks of the first frame; and
e) a detection process of detecting a changing frame by determining that the first frame has changed when the number of blocks counted by said changing block count process is equal to or greater than a predetermined value.

18. A storage medium storing a program for execution of each process constituting the control method described in claim 17 by a computer.

* * * * *

UNITED STATES PATENT AND TRADEMARK OFFICE
CERTIFICATE OF CORRECTION

PATENT NO. : 7,130,472 B2
APPLICATION NO. : 10/340720
DATED : October 31, 2006
INVENTOR(S) : Yoshio Iizuka et al.

It is certified that error appears in the above-identified patent and that said Letters Patent is hereby corrected as shown below:

<u>COLUMN 1</u>:

Line 10, "in using" should read --for use--; and
    Line 26, "determined" should read --determines--.

<u>COLUMN 2</u>:

Line 26, "try" should read --trial--.

<u>COLUMN 5</u>:

Line 6, "with" should read --of--; and
    Line 19, "with" should read --of--.

<u>COLUMN 8</u>:

Line 36, "similarly," should read --Similarly,-- and "weigh" should read --weight--.

<u>COLUMN 9</u>:

Line 62, "In FIG. 5," should read --FIG. 5 is--.

<u>COLUMN 10</u>:

Line 20, "frames" should read --frame--.

<u>COLUMN 11</u>:

Line 14, "closes." should read --closed.--.

<u>COLUMN 14</u>:

Line 22, "ration" should read --rations--.

<u>COLUMN 17</u>:

Line 34, "either or" should be deleted; and
    Line 36, "not" should be deleted.

UNITED STATES PATENT AND TRADEMARK OFFICE
CERTIFICATE OF CORRECTION

PATENT NO. : 7,130,472 B2
APPLICATION NO. : 10/340720
DATED : October 31, 2006
INVENTOR(S) : Yoshio Iizuka et al.

It is certified that error appears in the above-identified patent and that said Letters Patent is hereby corrected as shown below:

COLUMN 22:

Line 52, "above described" should read --above-described--.

COLUMN 24:

Line 8, "to" should read --to be--.

Signed and Sealed this

Fourteenth Day of August, 2007

JON W. DUDAS
*Director of the United States Patent and Trademark Office*